Dec. 13, 1949
G. W. WALTON
2,490,891
SYSTEM FOR REMOTE INDICATION AND CONTROL
AND AUTOMATIC COMPUTATION
Filed March 9, 1944
4 Sheets-Sheet 1
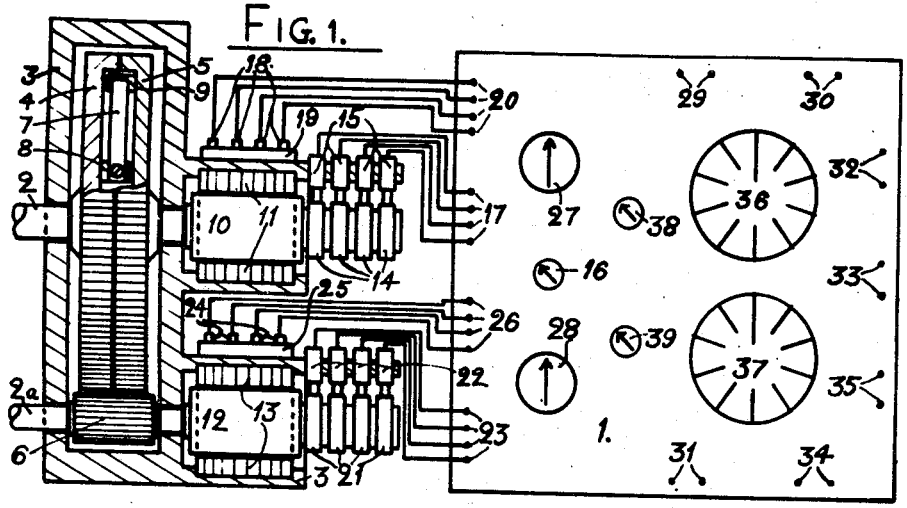
INVENTOR
George W. Walton.

INVENTOR
George W. Walton.

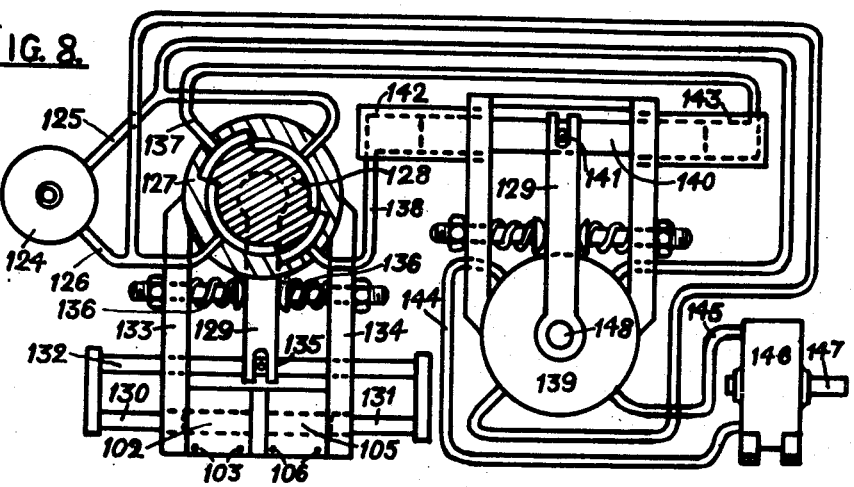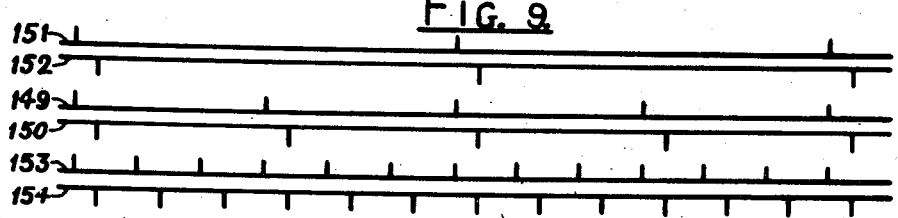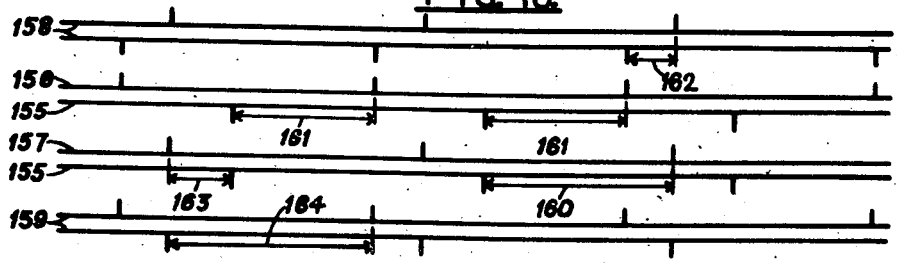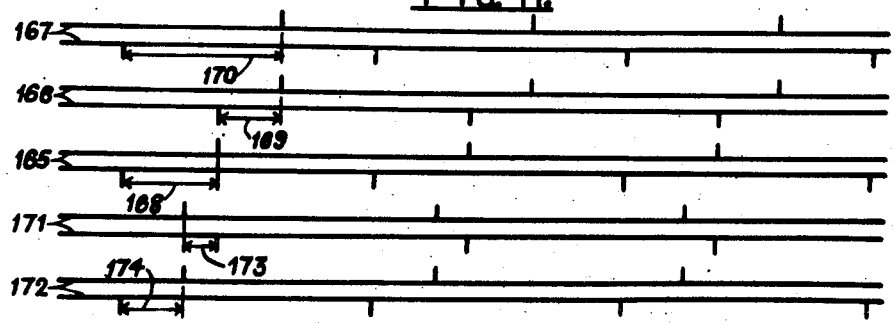

Dec. 13, 1949 G. W. WALTON 2,490,891
SYSTEM FOR REMOTE INDICATION AND CONTROL
AND AUTOMATIC COMPUTATION
Filed March 9, 1944 4 Sheets-Sheet 4
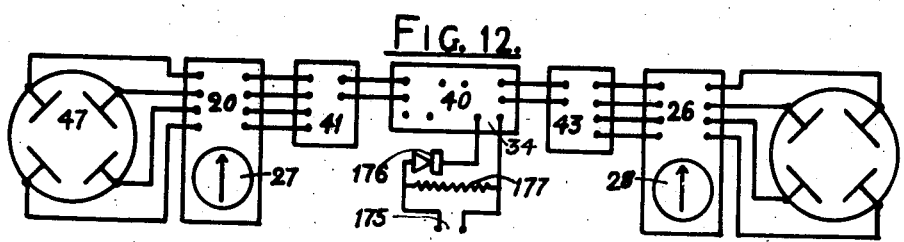
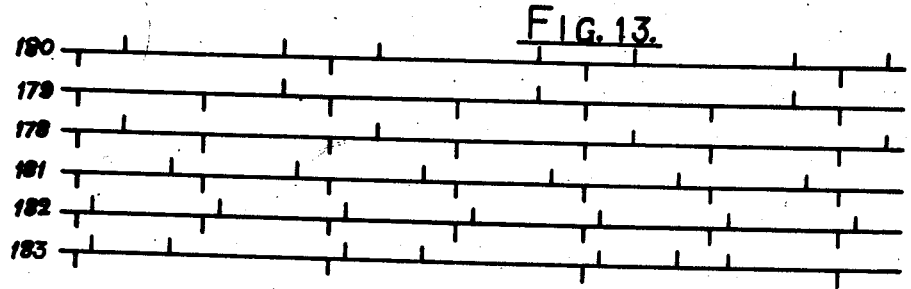
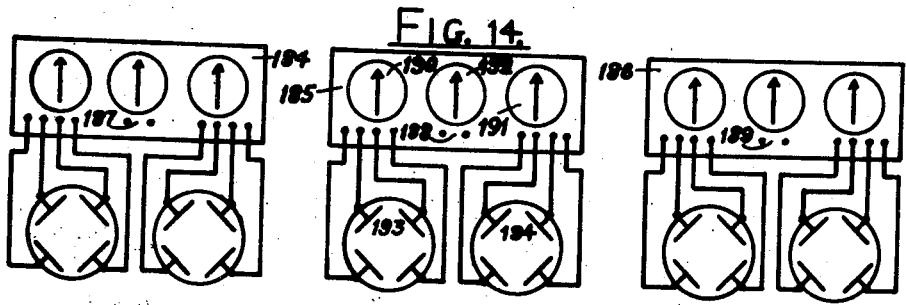
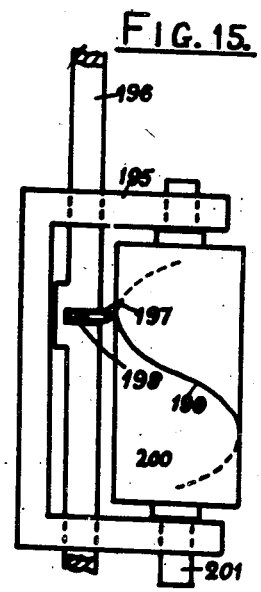
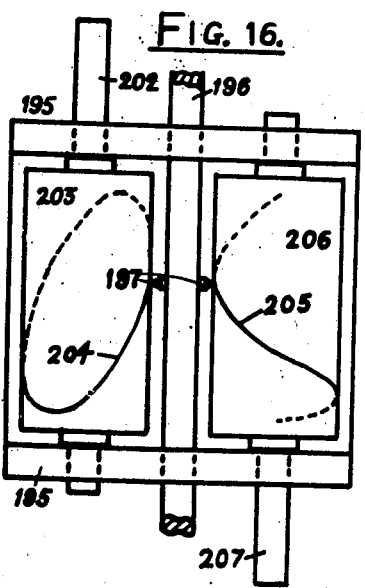
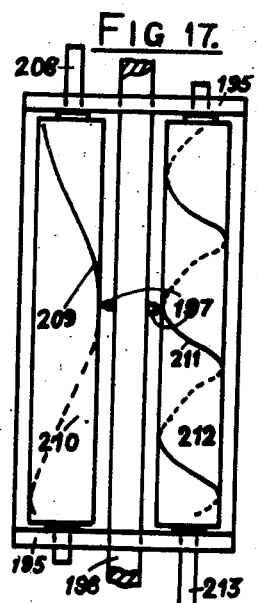
INVENTOR
George W. Walton Patented Dec. 13, 1949

2,490,891

UNITED STATES PATENT OFFICE 2,490,891

SYSTEM FOR REMOTE INDICATION AND CONTROL AND AUTOMATIC COMPUTATION

George William Walton, Farnham Common, England

Application March 9, 1944, Serial No. 525,716
In Great Britain September 3, 1941

Section 1, Public Law 690, August 8, 1946
Patent expires September 3, 1961

20 Claims. (Cl. 177—351)

This invention relates to a discovery of and systems for automatic computation employing remote indication and control and the like and to apparatus therefor.

In known kinds of systems which depend upon relating a magnitude to a signal the possible precision has been very limited chiefly by the low amount of information contained in the operative signal used in the system, possibilities of variations of intensity and/or frequency of the signal affecting accuracy and/or the inability of the receiver of the system to make full use of information contained in the signal. To obtain high precision in a system for automatic computation employing remote indication and control the nature of the operative signal is of paramount importance and no dependence can be placed on intensity, phase or frequency of a single component signal. In every such system the essential feature is that a magnitude be related to a dimension of the signal either linearly or in accordance with some mathematical function which is predetermined, pre-arranged or imposed by an inherent characteristic of the apparatus used. Clearly the dimension of the signal to which the magnitude is related must be one which cannot vary except within prescribed limits and those limits are dictated by the precision required. Time is one dimension of every signal which in itself does not vary but there is no constant scale on which time can be measured for the only way time can be appreciated is by sequence of events and such a sequence is not constant, i. e. it is an elastic measure which may stretch and contract erratically, and therefore if a magnitude is related to time it must be accompanied by the time-scale on which that time is measured.

In systems for automatic computation employing remote indication and control a magnitude may be very precisely related to a constant dimension of the signal by suitable apparatus but other apparatus cannot reproduce that magnitude with equal precision unless there are a sufficient number of items of information in the signal, the first said apparatus incorporates means for producing those items in the signal and the said other apparatus incorporates means which can use all those items in reproducing the magnitude, i. e. those items in a mathematical sense correspond to the significant digits in a number.

Systems for precise automatic computation employing remote control where appreciable power is necessary to move a body in accordance with a magnitude related to the signal require servo operation and means therefor in many cases must be responsive to rates of change of an original magnitude, i. e. those means must be capable of differentiating a variable with respect to time at least up to a predetermined order of differential co-efficient with respect to time, if the reproduction of the magnitude as movement of the body is not to lag to an extent which destroys the instantaneous precision of relation to the original magnitude related to the signal. This differentiation is additionally or alone of importance in automatic computation.

The most simple form of any system for automatic computation employing remote indication and control is one which comprises one station producing a signal and one station using that signal and only one magnitude is related to a dimension of the signal according to some mathematical function. That one magnitude may be the sum, difference, product, quotient or resultant of two or more magnitudes or it may be a factor, component, power, root or the like provided that means are associated with the producing station for deriving the magnitude to be related to a dimension of the signal from one or more than one original magnitudes. When the nature of the signal used in such a system is of a form which permits ready compounding with and/or variation by another such signal, with the corollary thereof that two or more signals can be derived from one such signal, then the scope and usefulness of the system is greatly enhanced, e. g. a number of stations producing signals may take part in the control of one or more than one station using signals in a manner which no one of the stations producing signals could do alone. Such a compound system clearly constitutes means for automatic computation whether or not remote control and/or indication is simultaneously performed by it, every signal used therein corresponding, in effect, to a number (which has a number of significant digits according to precision) which enters into the computation.

Hitherto computing machines have been manually operated and could only deal with constant magnitudes. Attempts have been made to evolve computing apparatus capable of dealing with a number of variable magnitudes but such success as has been achieved has been severely limited by lack of precision. Systems for automatic computation employing remote control and indication must be capable of dealing with variable magnitudes and if precision can be obtained to any predetermined limits then a compound system according to the last paragraph above would be capable of automatic computation with any number of constant and/or variable magnitudes to any required limit of accuracy and the rapidity of computation would be so great that for most practical purposes it can be regarded as instantaneous.

It is an object of the present invention to provide a system for automatic computation employing remote indication, and control which comprises means for relating a magnitude to time in a signal which contains the time-scale on which that time is measured and means for reproducing that magnitude according to a mathematical function from that signal.

Another object of the invention is to provide in such systems means for measuring a magnitude on a plurality of different scales and relating the several scales of magnitude to at least time in one signal, for the purpose of increasing precision, and means for reproducing a magnitude related to the original magnitude according to a mathematical function from the said signal.

Another object of the invention is to provide in such systems means for reproducing a magnitude related to an original magnitude by relating a plurality of magnitudes on different scales to at least time in one signal the said plurality of magnitudes being combined to form the said reproduced magnitude for the purpose of increasing precision in reproduction.

Another object of the invention is to provide in such systems means responsive to rate of change of a varying magnitude.

Another object of the invention is to provide in such systems means for comparing time intervals of two signals and deriving therefrom a signal related to any difference of the said time intervals.

The principal object of the invention is to provide a system for automatic computation which employs signals in transferring magnitudes entering into the processes of computation, control and indication and which comprises any number of signal producing devices and any number of intermediate devices producing, using, converting and combining signals which in co-operation provide signal control of any number of signal using devices the magnitude reproduced by each thereof being related according to a predetermined mathematical function to at least one original magnitude or to a magnitude which is the result of automatic computation in said system.

The invention will now be described making reference to the accompanying drawings but it must be understood that the invention is not limited to the particular devices illustrated which are given purely as examples arranged for the most convenient explanation and comprehension of the invention.

Fig. 1 shows a form of instrument suitable for use in producing, intermediate combination of or use of signals.

Fig. 2 is a diagram of the circuits of the instrument of Fig. 1 which deal with oscillations.

Fig. 3 shows a modified form of cathode-ray tube used in the instrument of Fig. 1 and shown in Fig. 2.

Fig. 4 is an explanatory diagram showing in graphs the relations between oscillations in the circuits of Fig. 2 and the associated impulses in the circuits of Fig. 5.

Fig. 8 shows an arrangmeent of fluid valves responsive to differential responses provided by the instrument of Fig. 6 which control servo reproduction of a magnitude.

Fig. 9 shows diagrammatically multiplication and division of a magnitude by change of the time-scale of its signal.

Fig. 10 shows diagrammatically the addition and subtraction of two magnitudes by combining their signals in a case when the signals have a common component.

Fig. 11 shows diagrammatically the addition and subtraction of one magnitude to and from another magnitude.

Fig. 12 shows instrument circuits for multiplication and division of magnitudes by change of signal time-scale.

Fig. 13 shows diagrammatically the combination of a plurality of signals by interspersal of impulses.

Fig. 14 shows instrument circuits for combining two signals by interspersal of impulses.

Fig. 15 shows an example of a device for relating a linear magnitude to an angular magnitude.

Fig. 16 shows an example of a device for relating an angle to the logarithm of the sine or cosine plus one of that angle, a linear magnitude to the logarithm of that magnitude and a linear magnitude to an angle.

Fig. 17 shows an example of a device for relating an angle to the logarithm of that angle and for relating a linear magnitude to the logarithm thereof as an angle.

Figure 5:
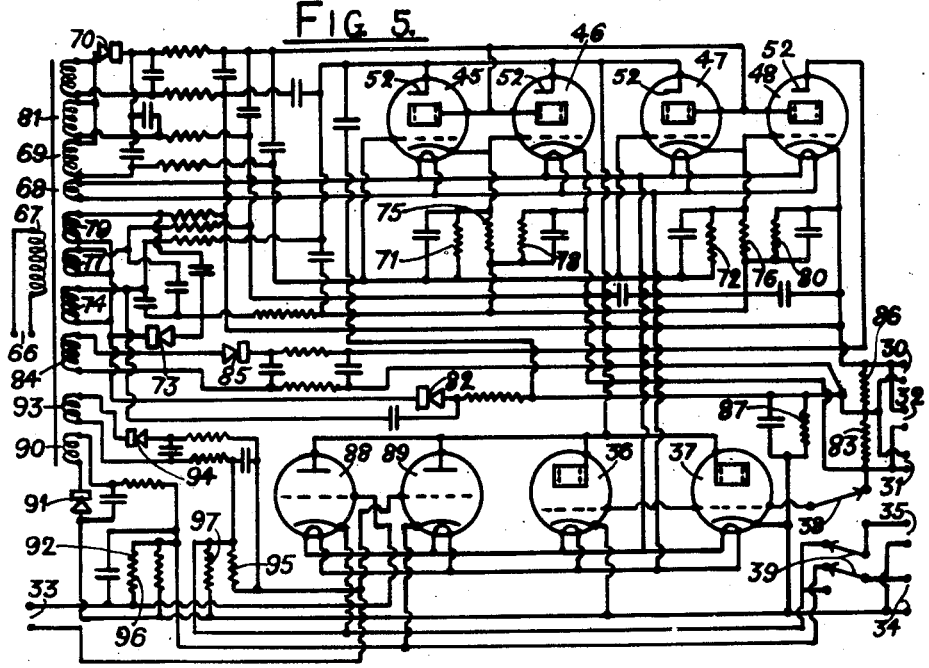
Fig. 5 is a diagram of circuits of the instrument 1 of Fig. 1 which deal with impulses.

In Fig. 1 a signal producing instrument 1 is associated with a phase displacing mechanism which has the shafts 2 and 2a which have bearings in the frame 3 and on the shaft 2 are the gearwheels 4 and 5 which mesh with the pinion 6 fixed on the shaft 2a. The gearwheel 4 is fixed to the shaft 2 and a spring 7 is fixed to a lug 8 integral with 4. The spring 7 applies pressure to a lug 9 integral with the gearwheel 5 which is otherwise free to turn on the shaft 2 so that as 4 and 5 both mesh with 6 backlash is prevented between 2 and 2a when the pressure of 7 is greater than any torque applied to 2. Fixed to the shaft 2 is the polyphase armature 10 co-operating with the stator 11 fixed to 3 and fixed to the shaft 2a is the polyphase armature 12 co-operating with the polyphase stator 13 which is fixed to 3. The armature 10 has the sliprings 14 and the brushes 15 held by an extension of 3 and the brushes 15 are connected to the terminals 17 of the instrument 1. The terminals 18 of the polyphase stator 11 are mounted on the insulating block 19 and are connected to the terminals 20 of the instrument 1. The armature 12 similarly has the sliprings 21 and brushes 22 connected to terminals 23 of 1 and the stator 13 has the terminals 24 on insulating block 25 connected to terminals 26 of 1. The mechanism above described constituting means for relating a magnitude to a plurality of spatial magnitudes, i. e. angular displacement of 2 to the angular displacements of 10 and 12 relative to 11 and 13 respectively.

The instrument 1 supplies polyphase oscillations to 11 and to 13 each of which forms a rotating magnetic field and the direction of the rotation of the fields can be reversed by the double reversing switch 16, e. g. with two phase supply by reversing one phase thereof. The phase of oscillations induced in the armature 10 relative to the phase of oscillations supplied to 13 depends on the angular position of 10 relative to 11 and if the shaft 2 is rotated through an angle then the phase of the oscillations at 17 will be advanced or retarded by a corresponding angle relative to the phase of oscillations at 20 but the angular movement of 2 is a magnitude and therefore that magnitude is related to a phase angle of oscillations by 10—11. The shaft 2a has a constant ratio of gearing to the shaft 2 and therefore the magnitude of angular displacement of 2 is related to a greater magnitude of angular displacement of 2a according to the gear ratio between the shafts and because of 12—13 to a phase displacement between the oscillations at 23 relative to those at 26, i. e. a magnitude of angular movement of 2 causes two phase displacements one of which is a multiple of the other.

The production and use of oscillations in the instrument 1 of Fig. 1 can be better understood from Fig. 2 in which a multioscillator unit 40 of known kind provides, in the present example, two distinct oscillations one being a harmonic of the other. The lower frequency oscillation is supplied by 40 to a phase-splitter 41 of known kind which supplies polyphase oscillations at that frequency to the known kind of phase adjuster 27 and that in turn supplies the polyphase oscillations to the stator 11. Similarly 40 supplies the higher frequency oscillation to the known kind of phase-splitter 43 which supplies polyphase oscillations at the same frequency to the known kind of phase adjuster 28 and that in turn supplies the polyphase oscillations to the stator 13. The polyphase oscillations induced in the armature 10 are supplied to the deflecting plates of the cathode-ray tubes 36 and 45 thereby causing circular sweeps of the beams of cathode rays therein and similarly the oscillations induced in the armature 12 are supplied to the deflecting plates of the cathode-ray tubes 37 and 46 producing circular sweeps of their beams of cathode rays. Any angular movement of the shaft 2 in Fig. 1 will simultaneously produce advance or retard of the sweeps of the beams of cathode rays in 36, 37, 45, and 46 which, if 10—11 and 12—13 are single-pole, will in 36 and 45 be equal to the angle of movement of 2 and in 37 and 46 will be a multiple of that angle of movement. Polyphase oscillations are supplied by 41 through leads 42 to the deflecting plates of the cathode-ray tube 47 and by 43 through the leads 44 to the deflecting plates of the cathode-ray tube 48 to produce circular sweeps of the beams of cathode rays in those tubes those sweeps being unaffected in phase by 16, 27, 28, 10—11 or 12—13. The phase sequence reversing switch 16 of known kind simultaneously reverses connections to one phase of the terminals 20 and of one phase of the terminals 26 thereby reversing the direction of sweeps in 36, 37, 45 and 46 so that the angle of advance or retard of the sweeps of those tubes correspond to an equal angle of retard or advance respectively. The phase adjusters 27 and 28 are for calibration purposes as by means of them constant angles of advance or retard can be added or subtracted to or from the sweeps of the tubes 36, 37, 45 and 46.

In Figs. 2 and 5 the cathode-ray tube 36 cooperates with 37, 45 with 46 and 47 with 48 the first of each of those pairs having the lower frequency of sweep. The cathode-ray tubes 36 and 37 are of the normal well known kind with fluorescent screen but 45, 46, 47 and 48 are of a modified kind shown in Fig. 3 in which there is no fluorescent screen. The envelope 49 in Fig. 3 contains any of the well known electrode systems having a cathode, anode, control electrode and focusing cylinder or cylinders when the beam of cathode rays is focused electrostatically and deflector plates when electrostatic deflection is employed the electrodes of the system being connected in the usual way to pins 50 in the base 51. Magnetic focusing and/or deflection of the cathode ray beam in the well known manners may be used with cathode-ray tubes in the present invention but electrostatic focusing and deflection is simpler in the small inexpensive tubes which are entirely satisfactory for the purposes of the present invention. In Fig. 3 the envelope 49 is shown partly cut away to expose the target electrode 52 which takes the place of the fluorescent screen in ordinary cathode-ray tubes. The target electrode 52 is mounted inside the tube to be edge on to the cathode rays and is a thin plate of metal fixed to the support 53 which is electrically connected to the cap 54. The target electrode 52 is radial to the axis of the tube and the cathode rays are focused in the plane of 52 with a circular sweep of the beam so that when 52 has a suitable positive potential relative to the cathode of the tube a sharp impulse is produced in the cathode-target-electrode circuit once in every revolution of the cathode ray beam when the cathode rays fall on 52.

The device of Fig. 3 as used in the instrument 1 of Fig. 1 and shown in Figs. 2 and 5 plays a very important part in securing increased precision which will be better understood from Fig. 4. If the curve 55 in Fig. 4 represents one phase of oscillation supplied to 47 in Fig. 2 and the curve 60 represents the corresponding phase of oscillation applied to 45 in Fig. 2 then it is clear that the time interval between the peak 57 of 55 and the peak 62 of 60 is accurately related to the angular displacement of the shaft 2 in Fig. 1 if 57 and 62 are coincident in time when angular displacement of 2 is zero. The absolute value of the time interval between 57 and 62 may vary from cycle to cycle of the oscillations 55 and 60 if the frequency of the oscillations 55 and 60 varies so that angular displacement of 2 is not accurately related to an interval of absolute time but is accurately related to the ratio of time intervals $t/p$ if $t$ is the absolute value of the time interval between 57 and 62 and $p$ is the absolute value of the period of the one cycle of the oscillations 55 and 60 in which $t$ is measured, i. e. $p$ provides the immediate time-scale on which $t$ is to be measured. The oscillations 55 and 60 are both produced by the one oscillator 40 in Fig. 2 and therefore with undisturbed adjustments of the instrument of Figs. 1 and 2 the instantaneous ratio of time intervals $t/p$ is equal to the instantaneous ratio of the angle of displacement of 2 to 360 degrees if $t$ is zero when displacement of 2 is zero.

From the above it is clear that an angular magnitude is very accurately represented by the time interval $t$ on the time-scale $p$ but a second angular magnitude exactly equal to the original angular magnitude cannot be reproduced from the oscillations 55 and 60 because the rates of change of intensity about the peaks 57 and 62 are very small and any apparatus used must be dependent on changes of intensity. The device of Fig. 3 depends on time in operation and is independent of intensity the time duration of an impulse in its target electrode circuit depending on the sum of the angular sizes of the focused spot of cathode rays and the thickness of 52 at the radius of sweep and the angular velocity of the sweep so that the time duration may be a very small fraction of the period of the sweep. Also the duration of the impulse is not affected by its intensity and the period between two successive impulses is exactly equal to the period of the sweep no matter if the radius thereof varies or is elliptical or irregular.

In Fig. 2 the tube 48 co-operates with the tube 47 but the sweep of 48 is at a higher frequency so that the duration of an impulse in its target electrode circuit relative to the duration of an impulse in the target electrode circuit of 47 is in the same ratio as the periods of sweep of 48 to 47. The curve 55 shows one phase of oscillation applied to 47 and the curve 56 one phase of the oscillation applied to 48 and if the positive peaks of both are in phase at 57 and at that instant 47 and 48 both have impulses in their target electrode circuits then as 56 is a harmonic of 55 the double impulse will be produced only once per cycle of 55. The impulse of 47 can limit the impulses produced by 48 to one per cycle of 55 at the instant 57 as shown by 58 in Fig. 4 in which the points 59 show the instants at which 48 would produce other impulses but for the limiting action of the 47 impulse. The result of this is that 58 is a train of impulses with a period exactly equal to the period of 55 but with the impulse duration of the tube 48 which can be very small in view of the fact that the period of sweep in 48 may be equal to or appreciably less than the duration of the impulse of 47. In the same way the tubes 45 and 46 provide a train of impulses with the period of 60 and 55 and the duration of impulse due to 46, 60 being the curve of one phase of oscillation applied to 45, 61 being one phase of the oscillation applied to 46 which is in phase with 60 at the instant 62, 45 and 46 both producing impulses at the instant 62, the impulse of 45 limiting impulse produced by 46 to that at the instant 62 as shown in 63 in which the points 64 show the instants at which 46 would produce other impulses but for the limiting action of the 45 impulses. The oscillation 61 in frequency is a multiple of 60 that multiple being equal to the gear ratio between 2 and 2a in Fig. 1 so that movement of 2 time phase displaces 60 and 61 equally, i. e. a positive peak of 61 is always in phase with the positive peak of 60 however 2 is moved and the impulses produced by 45 and 46 are always at the instants 62.

The impulses 58 may be negative and the impulses 63 positive as shown in Fig. 4 so that they can be directly added to form one intermittent signal 65 comprising two distinct components which can be readily separated by simple rectifiers or limiting valves. Each train of impulses 58 or 63 is a cosine series of harmonics the fundamental having the period of 55 and the number of harmonics being approximately equal to the fundamental period divided by the duration of one impulse. Each of those harmonics is an additional item of information relating to the time-position of the impulses and therefore to the value of the time interval $t$ between a variation or impulse of 58 and a variation or impulse of 63, i. e. between 57 and 62, and also of the period $p$ between successive variations or impulses of 58 or 63 whichever is used as the reference component and from these the ratio $t/p$ which is precisely related to the magnitude of angular displacement of the shaft 2 in Fig. 1. The precision with which the ratio $t/p$ can be obtained from the signal 65 depends on the number of stages geared together in the instrument of Fig. 1, in Fig. 1 there are two such stages the first comprising 10—11, 45 and 47 and the second stage comprising 12—13, 46 and 48. Even in one stage the tubes 45 and 47 give greatly increased precision as will be appreciated from Fig. 4 for suppose 55 and 60 were transmitted to a distant station then each must have a channel of its own and at that station the phase difference could not be measured except with a possible error of about 10 degrees at usual signal intensities but with 45 and 47 in that stage as small tubes with a radius of sweep of one centimetre precision can be increased 50 to 100 times and with larger tubes having more than 10 centimetre radius of sweep precision could be 1000 times better. With three or four geared stages using small tubes an accuracy of one second of angle is possible. It is obvious that such a precise signal is the equivalent in automatic computation of an arithmetical number which is accurate to a predetermined number of significant digits on a scale of notation which is decided by the said gearing between stages and as a signal it is of the greatest importance and utility in automatic computation, particularly as it can be related to a magnitude having any variation without reduction of that precision.

Fig. 5 shows one example of circuits of the tubes 45, 46, 47 and 48 of Fig. 2 for producing impulses as described in connection with Fig. 4 and for the tubes 36 and 37 in Figs. 1 and 2 which uses cathode resistors and direct connections between tubes for the purpose of minimising phase distortions of the impulses. In Fig. 5 a source of A. C. is connected to the terminals 66 of a transformer primary 67 the transformer having a number of separate secondaries of which 68 supplies heater current to the heaters of all the tubes and valves. All of the other secondaries are associated with rectifiers and smoothing circuits for the supply of D. C. to the electrode circuits of the tubes and valves. The secondary 69 through rectifier 70 supplies anode potential to tubes 45 and 47 the negative being connected to the cathode resistors 71 and 72 to the cathodes of 45 and 47 respectively the grids of those tubes being connected to that negative. No signal is applied to the grids of 45 and 47 so that they operate with constant intensity of the cathode ray beams potential drop across 71 and 72 providing negative bias to the respective grids so that the desired intensity of the beams is obtained. The target electrode circuits of 45 and 47 have an independent D. C. supply provided by the rectifier 73 and the secondary 74 the negative return being through the target electrode circuit resistors 75 and 76 respectively of 45 and 47. The cathodes of 45 and 47 are direct connected to the grids of 46 and 48 respectively and negative cut-off bias is applied to those grids by the rectifiers 73 and secondary 77 across the resistor 78 in the case of 46 and by rectifier 73 and secondary 79 across the resistor 80 in the case of 48. The anode circuit of 46 is supplied with D. C. by the secondary 81 and rectifier 70 with negative return direct connected to the cathode of 46 and the anode circuit of 48 is supplied with D. C. by the secondary 81a and rectifier 70 with negative return direct connected to the cathode of 48.

The tube 46 is biassed to cut-off and therefore no cathode rays can fall on its target electrode until a positive potential is applied to its grid and this can only occur when cathode rays fall on the target electrode of 45 which produces a voltage across 75 thereby applying a positive potential to the grid of 46 in opposition to its negative bias so that there is no longer cut-off and so 46 is limited to one impulse in its target electrode circuit in every cycle of the sweep of 45. Similarly 48 is limited to one impulse in its target electrode circuit in every cycle of the sweep of 47, i. e. when cathode rays fall on the target electrode of 47 producing a potential across 76 thereby applying a positive potential to the grid of 48.

The target electrode circuit of 46 is supplied with D. C. by the secondary 74 and the rectifier 82 with negative return from the cathode of 46 through the output resistor 83 across which a potential is developed when cathode rays fall on 52 of 46. The target electrode circuit of 48 is supplied with D. C. by the secondary 84 and the rectifier 85 with negative return from the cathode of 48 through the output resistor 86 across which a potential is developed when cathode rays fall on 52 of 48. The terminals 30 (Figs. 1 and 5) are connected to the ends of the resistor 86 and from them can be taken the train of impulses produced by 48 in the form of 58 in Fig. 4 and the terminals 31 (Figs. 1 and 5) are connected to the ends of the resistor 83 and from them can be taken the train of impulses produced by 46 in the form of 63 in Fig. 4. The resistors 83 and 86 are connected in opposite sense with the terminals 32 (Figs. 1 and 5) connected to the free ends of 83 and 86 and from those terminals can be taken the signal in the form of 65 in Fig. 4 due to the addition of the trains of impulses produced by 46 and 48. The whole of the electrical part of the Fig. 1 instrument constitutes means for relating a plurality of spatial magnitudes to the $t/p$ ratio of a signal.

The instrument of Figs. 1, 2 and 5 may be used as a producer or as a user of signals, the whole arrangement of Fig. 1 being used in control of movement of a body with or without automatic computation and similarly only the instrument 1 of Fig. 1 for indication of the value of the $t/p$ ratio contained in a signal with terminals 17 connected to 20 and 23 connected to 26. For such control or indication the terminals 33 Fig. 5 have the incoming signal applied to them one being connected to the grid of the valve 88 and the other to the grid of the valve 89. The secondary 90 and rectifier 91 supply negative bias to the grid of 88 across a resistor 92 connected between the grid of 88 and the cathode of 89. Similarly the secondary 93 and rectifier 94 supply negative bias to the grid of 89 across a resistor 95 connected between the grid of 89 and the cathode of 88. The secondary 74 and rectifier 82 supply D. C. to the anode circuits of 88 and 89 with negative return from the cathodes thereof through the resistors 97 and 96 respectively and the resistor 87. When a signal such as 65 in Fig. 4 is applied to the terminals 33 one component produces a train of impulses across 96 and the other component a train of impulses across 97 and by means of the reversing switch 39 (Figs. 1 and 5) 96 can be connected across the terminals 34 with 97 connected across 35 or vice versa, i. e. the components of the signal are separated with one at 34 and the other at 35.

The ordinary cathode-ray tubes 36 and 37 are for visual indicating purposes and have their anodes connected together, their grids connected together and their cathodes connected together anode current being supplied by the secondary 74 and rectifier 82 the cathode resistor 87 providing negative grid bias to the tubes 36 and 37. By means of the switch 38 the train of impulses at terminals 31 can be applied to the grids of 36 and 37 or the train of impulses at terminals 35 can be applied to those grids the former affording indication when 45 and 46 are in time-phase during signal production and the latter during indication of the $t/p$ ratio of a signal supplied to the terminals 33. During such indication impulses at terminals 34 are applied to the oscillator 40 in Fig. 2 for the purpose of synchronising and phasing the oscillations produced by 40, i. e. those oscillations are brought into the same phase at the same fundamental frequency as the train of impulses. The train of impulses at terminals 30 are also applied to 40 as a kind of feed back which not only tends to stabilise the frequency and phase of the fundamental frequency oscillation supplied to 41 in Fig. 2 but also controls the frequency and phase of the harmonic oscillator in 40 which supplies the oscillation to 43 without any direct control by the fundamental oscillator in 40 for the train of impulses at 30 is a cosine series of harmonics rigidly linked to the fundamental so that each of the harmonics is in exact time-phase with the fundamental and has a frequency which is an exact multiple of the fundamental and therefore as that series must include a harmonic with a frequency equal to that of the harmonic oscillator in 40 there can be no better means of controlling that oscillator than that train of impulses.

The operation of the tubes 36 and 37 will be best understood in the case of calibration and indicating the $t/p$ ratio of the signal in signal production with the apparatus of Fig. 1 in which the ends of the tubes 36 and 37 have circular scales each with ten divisions and if the gearing between 2 and 2a is 10 to 1, the circular sweep in each tube is clockwise and the negative bias applied to the grids of the tubes by 87 in Fig. 5 is such that without positive impulses applied to those grids the trace of the cathode rays on the screens of the tubes is barely visible then when the train of impulses at terminals 30 is applied to the grids of the tubes by the switch 38 and connecting terminals 30 and 35 a bright point will appear on the screen of each tube in the path of the sweep of the cathode rays in each. Those points will be little larger angularly than the focused spot of the tubes because of the short duration of the impulse and they will not be continuous but will appear simultaneously in each tube at the frequency of the train of impulses, if that frequency is more than 20 cycles per second the points will appear to be continuous because of persistence of vision. With the shaft 2 in Fig. 1 stationary the bright point on the screen of 36 can be moved to any angular position in the circular scale by adjustment of 27, e. g. to the long zero line, and similarly the bright point on the screen of 37 can be moved to any angular position in its circular scale by adjusting 28. The controls 27 and 28 are for calibrating the instrument, e. g. in Fig. 4 moving 62 until it is coincident with 57 or at a desired time interval from 57 the control 28 bringing 61 into phase with 60 thereby obtaining the strongest 63 impulses and the brightest points on the screens of 36 and 37.

Suppose the bright points are brought onto the zero lines of their respective scales in 36 and 37 then any movement of the shaft 2 will cause the bright points on the screens of 36 and 37 to move circularly over their respective scales the movement in 37 being ten times greater than in 36, i. e. one division in 36 would be accompanied by the full ten divisions in 37 and therefore each division in 37 is equal to a tenth of a division in 36. By means of the two scales it is possible to read off any angular movement to 54 minutes the scale of 36 giving multiples of 36 degrees in the number of complete divisions through which its bright point moves, the scale of 37 giving additionally multiples of 3.6 degrees up to the tenth multiple in the number of complete divisions through which its bright point moves and a quarter of a division in the scale of 37 can be readily estimated. With quite small tubes 36 and 37 there may be 60 to 100 divisions of each scale and at 60 divisions per scale the angle of movement of 2 could be read to an accuracy of 3 minutes and if the instrument of Fig. 1 had three geared stages as previously explained there would be a third tube such as 37 with which the accuracy could be 3 seconds and with a fourth such stage the accuracy would be 0.05 second. The indications provided by the tubes 36 and 37 depend on time and are wholly independent of intensity of the bright point or the deflecting fields of the tubes and the sweeps of the tubes may be elliptical, varying in radius, irregular or may have a ripple without affecting accuracy.

The instrument of Fig. 1 used for final indication in automatic computation or in remote indication has terminals 17 connected to terminals 20 and terminals 23 connected to terminals 26 the incoming signal, produced by a distant instrument such as that of Fig. 1, is applied to the terminals 33 and the component of that signal at the terminals 34 controls the oscillator 40 and therefore the sweeps of the tubes 36 and 37 whilst the component of the signal at terminals 35 is applied by means of the switch 38 to the grids of those tubes. When first brought into operation the receiver is calibrated as described above and thereafter the tubes 36 and 37 provide a continuous indication to any desired accuracy depending on sufficient shortness of duration of the individual impulses in the signal, the radius of sweep in the tubes, the number of divisions in their circular scales and the number of tubes such as 36 and 37. The instrument 1 of Fig. 1 therefore constitutes means for reproducing one or a plurality of spatial magnitudes related to the $t/p$ ratio of the signal.

Final or other control in automatic computation requires the movement of something which may be small and needing little power to move it or it may be large and heavy so that considerable power is required to move it. In either case the signal used in the invention cannot be satisfactory as power for accomplishing movement of a body for even after considerable amplification the energy of the signal is small and is less with increased precision and furthermore that energy is in no way related to the essential information in the signal, i. e. the $t/p$ ratio. Clearly at a point of control there must be a local source of energy, such as electric, hydraulic, compressed air, heat and the like, which as a means of servo action effects movement of a control body. The signal is not of a form which can directly or of itself alone control that local energy or the rate at which that energy is used, i. e. the power, for the ratio $t/p$ is solely a matter of time. The extent to which a control body is moved is a magnitude which can be precisely related to a $t/p$ ratio in a signal according to the invention and therefore much greater precision of control can be obtained by checking that magnitude by relating it to a $t/p$ ratio, comparing that ratio with that of the received signal and using any error to control the local energy, i. e. the control of the local energy is a secondary matter which need not be particularly precise.

Suppose the controlled body is a spindle which it is required shall be at the same angular displacement around its axis from some zero reference angle thereof as is the shaft 2 in the instrument of Fig. 1 which produces the signal to be used for control, then coupled to that spindle must be a servo device for turning it and means for controlling the servo device as hereinafter described. At the point of control an instrument as in Fig. 1 would be used with its shaft 2 coupled to the said spindle and the incoming signal from the distant transmitter would be applied to the terminals 33 of the instrument at the point of control the components of that signal appearing at the terminals 34 and 35 respectively. The instrument at the point of control would be calibrated as described above by applying the impulses at 35 to the grids of tubes 36 and 37 by means of the switch 38, turning the spindle and therefore 2 to zero angle if calibration is to be at zero and adjusting 27 and 28 so that in either position of switch 38 the same reading is obtained from 36 and 37. After calibration whatever the angular displacement of the spindle there will be a train of impulses at the terminals 31 displaced by a time interval $t$ from the impulses at 34 measured on the time-scale $p$ which is the period of the impulses at 34 and the impulses at 35 are similarly displaced by a time interval from those at 34 which is also measured on the same time-scale $p$. Clearly the impulses at 31 can be directly compared with those at 35 instead of comparing the $t/p$ ratio of the 31—34 signal with that of the 35—34 signal and if there is no time interval of displacement between the 31 and 35 impulses then the angle of displacement of the spindle at the point of control is the same as the angle of displacement of the shaft 2 at the signal producing instrument within the precision of the system in use. Should the angular displacement of the spindle at the point of control be different to that of the shaft 2 at the signal producing instrument the 31 impulses will have a time interval of displacement from the 35 impulses and if that time interval or error is $e$ then the angular error of the spindle displacement will be plus or minus $360\ e/p$ degrees if phase displacers such as 10—11 in Fig. 1 are all single pole.

Figure 6:
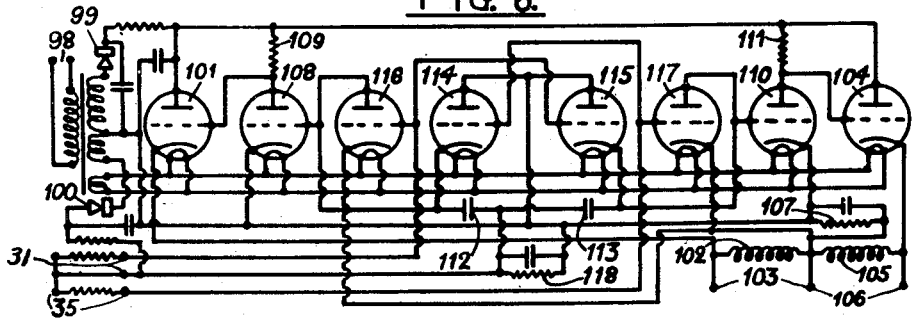
Fig. 6 is a circuit diagram of an instrument for comparing two signal components and deriving therefrom a differential response.

Fig. 6 shows an example of circuit diagram of an intrument for comparing the 31 and 35 impulses and deriving therefrom a differential response the mean energy of which is approximately proportional to $e/p$ as described in the last paragraph above. In Fig. 6 a source of A. C. is connected to the terminals 98 of the primary of a transformer one secondary of which supplies current to the heaters of all of the valves and the other secondary through rectifier 99 supplies anode current to the valves 101, 104, 108 and 110 and through the rectifier 100 supplies negative grid bias to the valves 108, 110, 114, 115, 116 and 117. The cathode of 101 is connected to a coil 102 connected across the terminals 103 and the cathode of 104 is connected to a coil 105 connected across the terminals 106 the coils 102 and 105 being in parallel and each in series with the resistor 107 to the negative return of the anode current supply. The coils 102 and 105 would normally be external to the instrument, e. g. they would be the windings of an electromagnetic device as shown in Fig. 8, and be simply connected to the terminals 103 and 106. The anode of 108 is connected to the grid of 101 and 108 is supplied with current through the resistor 109 so that when a heavy current flows through 108 there is a voltage drop across 109 and a cutoff negative potential is applied to the grid of 101. Similarly a cut-off negative potential is applied to the grid of 104 when a heavy current flows through 110 and the resistor 111. The valve 114 normally biased to cut-off when a positive impulse is applied to its grid becomes conducting and charges the condenser 112 to the voltage across the resistor 118 the charge of 112 opposing the negative bias applied to the grid of 108 so that the impedance of 108 is low and 101 is at cut-off and similarly a positive impulse applied to the grid of the valve 115 charges the condenser 113 so that 110 is at low impedance and 104 at cut-off. The valve 116 is biased to cut-off and therefore 112 cannot discharge through it and similarly 113 cannot discharge through the valve 117.

Suppose that the two trains of impulses are applied to the terminals 31 and 35 respectively and that an impulse at 31 is earlier than the next impulse at 35 then a positive impulse is applied to the grids of the valves 115 and 116 then the former will charge the condenser 113 and the latter will discharge the condenser 112 so that 101 becomes conducting and 104 is maintained nonconducting and both will remain in those states until a positive impulse is applied to the grids of the valves 114 and 117 on which the condenser 112 will be charged but 113 will not discharge because the resistor 107 due to current through 101 applies a positive potential to the cathode of 117 which is equal to or more than the potential of 113 and in effect an increased negative bias is applied to the grid of 117 so that 113 cannot be discharged by 117. This action will continue so long as the 31 impulses are in advance of the 35 impulses and the result will be better appreciated from the graphs of Fig. 7 in which 119 represents the 31 impulses and 120 the 35 impulses and the resulting current in the coil 102 is shown by 121. Each of the rectangular impulses in 121 is started by a 119 impulse and continues until ended by a 120 impulse so that the duration of a 121 impulse relative to the period of the impulses is proportional to $e/p$ and therefore the mean energy in the 121 impulses is equal to $e/p$. The 121 impulses can be used to control the servo drive of the spindle at the receiver so that the spindle is rotated until there is no time interval between the 119 and 120 impulses at which there will be no current in the coil 102 in Fig. 6 or there will be opposing currents in 102 and 105 which is equivalent to no current for those coils are in practice one coil with a centre tap.

Figure 7:
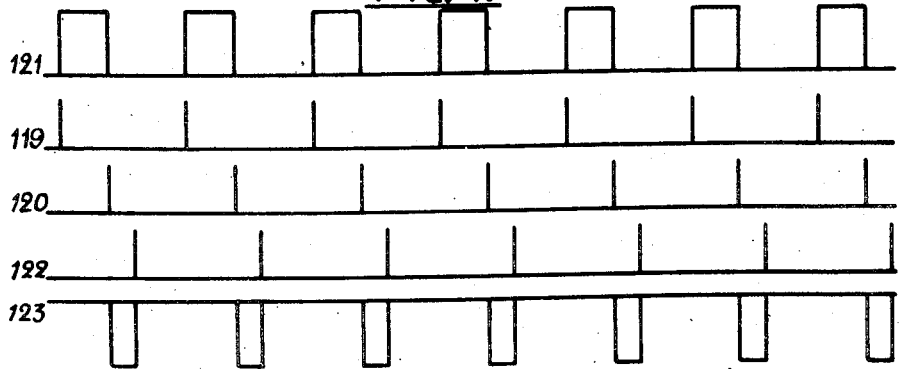
Fig. 7 is a diagram showing in graphs examples of relations between signal components in the instrument of Fig. 6 and the resulting differential responses.

If the 31 impulses lag behind the 35 impulses then in Fig. 6 the latter will initiate current flow through the coil 105 and the former impulses will terminate that flow as shown in Fig. 7 where 120 represents the 35 impulses and 122 the 31 impulses and 123 shows the rectangular impulses in the coil 105. The mean energy of the 123 impulses is proportional to $e/p$ and is negative to the 121 impulses so that across the pair of coils 102 and 105 in Fig. 6 a differential current is produced with a mean energy proportional to plus or minus $e/p$ and that current can be used to differentially control the servo drive of the spindle at the receiver so as to adjust the angular displacement of that spindle until it is equal to the angular displacement of the shaft 2 at a distant transmitter.

The valves 101 and 104 in Fig. 6 may be gas relays if a strong differential response is required. The differential response of the arrangement of Fig. 6 may in some cases provide power for the servo drive of the spindle in the example described above. For example a D. C. electric motor having a permanent magnet field of a well known kind may be geared to the spindle with its armature brushes connected across the pair of coils 102 and 105 in Fig. 6 the differential response of which will not only decide the direction of rotation of the motor and therefore of the spindle but also the speed and power of the motor for when the error of the angular displacement of the spindle is great the speed and power of the motor will be high but when that error is small the speed and power of the motor will be small, i. e. a characteristic which is very desirable in automatic adjustment of the angular displacement of the spindle. Clearly Fig. 1 together with Fig. 6 constitutes means for relating a spatial magnitude, i. e. displacement of the spindle, to the $t/p$ ratio of a signal.

The above example of means for servo adjustment of the angular displacement of the spindle would not be satisfactory in a case where it is necessary that there be a minimum or no lag in the angular adjustment, for example when that displacement must vary continuously and the instantaneous angular displacement of the spindle at the point of control must be equal to the angular displacement of the shaft at the signal producing instrument within very small limits. If the magnitude at the signal producing instrument is varying then the reproduced magnitude at the point of control must also vary which means that the servo adjustment must be in operation continuously during the variation and therefore there must be a differential response from the instrument of Fig. 6, i. e. that response cannot be zero, but there can be no such response without a plus or minus $e/p$ error and if there is an error the reproduced magnitude cannot be instantaneously equal to the original magnitude. Furthermore increased rate of change of variation increases error. Fig. 8 shows one example of servo means for adjusting a continuously varying magnitude.

In Fig. 8 a hydraulic pump 124 supplies fluid at pressure through the pipe 125 to a valve 127—128 and a valve 139 low pressure discharge from the valves being returned through pipe 126 to 124. The first of these valves is shown sectioned in a plane normal to its axis and consists of a body 127 with a cylindrical bore in which turns a cylinder 128 which has two diametrically opposite segments of annular grooves one of which is supplied with fluid under pressure by 125 and the other has fluid at low pressure and is in communication with the pipe 126. Between the groove segments 128 is solid. In 127 the cylinder 128 is turned by an arm 129 rigidly fixed to 128 and 129 is moved by a double solenoid having the windings 102 and 105 in which move the plungers 130 and 131 respectively the plungers being rigidly fixed to a rod 132 which is free to slide in holes in the members 133 and 134 which are rigidly fixed to the body 127 and to the iron case of the solenoid 102—105. In the rod 132 is a pin 135 which engages in a slot in the end of the arm 129 and without energisation of 102 or 105 the arm 129 is held in the mean position, as shown in the drawing, by the limited springs 136. In the bore of the body 127 are two recesses each opposite a solid part of 128 when in the mean position and one of these recesses is in fluid communication with the pipe 137 and the other with the pipe 138.

When current flows in the winding 102 in Fig. 8 the pipe 137 is put into communication with the pipe 125 and the pipe 138 with the pipe 126 because 130 is drawn into 102 thereby swinging the arm 129 and turning 128 so that the groove segments therein are put into fluid communication with the recesses in the bore of 127 the amount of groove exposed in a recess depending on the strength of the current in 102 and therefore on the pull of the solenoid operating against the pressure of one of the springs 136. When a current flows in the winding 105 the same action occurs but with opposite movements so that 137 communicates with 126 and 138 with 125.

The second valve 139 in Fig. 8 is similar in structure and operation to the 127—128 valve except that it is hydraulically operated by means of a plunger 140 having a pin 141 engaging in the slot in the end of the arm 129 the plunger 140 being double ended and sliding in the cylinders 142 and 143 which are rigidly fixed to the body of 139. The pipe 137 is in fluid communication with the cylinder 143 and the pipe 138 with the cylinder 142 so that when 102 is energised fluid under pressure is supplied by 124 through 125, valve 127—128, pipe 137 to cylinder 143 thereby forcing 140 outwards from 143 and inwards in the cylinder 142 fluid in which flows through 138, 127—128 and 126 to the pump 124. The movement of 140 operates the valve 139 putting 125 into fluid communication with 144 and 126 into fluid communication with 145. A multi-cylinder hydraulic engine 146, of well known kind, with a shaft 147 is therefore supplied with fluid under pressure through 144 and discharges that fluid at low pressure through 145 and 147 will rotate in one direction. The direction of rotation of 147 would be reversed if 105 were energised instead of 102 for then fluid under pressure would be supplied through 125, 127—128, and 138 to 142 and 140 would move outwards in the cylinder 142 thereby operating 139 in the reverse direction so that fluid under pressure is supplied through 145 to 146 which would cause opposite rotation of 147.

The full operation of the servo arrangement shown in Fig. 8 will be better appreciated from an explanation of the working of a full control system which at the point of control consists of the instrument of Fig. 1 the shaft 2 of which is rigidly coupled to the shaft 147 of the arrangement of Fig. 8 and the terminals 31 and 35 of the Fig. 1 instrument are connected respectively to the 31 and 35 terminals of the instrument of Fig. 6 and the terminals of the Fig. 6 instrument 103 and 106 are respectively connected to the 103 and 106 terminals in the Fig. 8 arrangement, i. e. to the windings 102 and 105 respectively. The signal producing instrument of the control system is the instrument of Fig. 1 and let it be assumed that the shaft 2 of the signal producing instrument is at zero angular displacement and that the instrument of Fig. 1 at the point of control has been calibrated to zero angular displacement of its shaft 2 then in Fig. 7 the 119 impulses are coincident with the 120 impulses, the differential response 121 is zero, the Fig. 6 instrument provides no differential response, the valve arms 129 in Fig. 8 are in their mean positions and the valves 127—128 and 129 are closed and the shaft 147 is not rotating. Now suppose that the shaft 2 at the signal producing instrument is accelerated until it attains a constant angular velocity then, in effect, 120 in Fig. 7 would have a velocity to the right but 119 has no such velocity and therefore lags behind 120 so that there is a minus $e/p$ error and the Fig. 6 instrument will provide a differential response such as 121, a current is therefore supplied to 102 in Fig. 8 which causes opening of the valve 127—128 and the supply of fluid to 143 which causes opening of the 139 valve and supply of fluid at pressure through 144 to 146 and 147 begins to rotate at which the 119 impulses in Fig. 7 will have a velocity in the same direction as the 120 impulses. So long as there is a minus $e/p$ error current will be supplied to 102 in Fig. 8 and therefore fluid will be supplied to 143 causing continuously increased opening of the valve 139 and therefore acceleration of 147 and of 119 in Fig. 7. So long as the velocity of 119 is less than that of 120 in Fig. 7 the minus $e/p$ error will grow, the mean energy of the differential response will increase, the opening of the 127—128 valve will increase, the rate of opening of 139 will increase and the rate of acceleration of 147 will increase, i. e. 119 will be accelerated. As 119 is being accelerated it will eventually have a velocity greater than that of 120 and the differential response of the instrument of Fig. 6 will gradually decrease, current to 102 in Fig. 8 will decrease, the opening of valve 127—128 will decrease, the rate of opening of 139 will decrease and the acceleration of 147 will decrease until 119 impulses are coincident with those of 120 but as the velocity of 119 is greater the latter will move into advance of 120, i. e. 119 becomes 122, at which there will be a positive $e/p$ error with a reversed response, such as 123, from the Fig. 6 instrument, a current will be supplied to 105 in Fig. 8, a reversed opening of 127—128, a reversed movement of 140, reduction of the opening of 139 and deceleration of 147 which will continue until the positive $e/p$ error is zero. There may be repeated changes as above described with the error first negative and then positive with repeated acceleration and deceleration of 147 but this will rapidly decrease in a few cycles of hunt of 147 until there is no $e/p$ error, no response of the Fig. 6 instrument, no current to 102 or 105 in Fig. 8, the valve 127—128 will be closed, no fluid flow to or from 142 or 143, the valve 139 will have a constant opening and the shaft 147 will have a constant angular velocity and will be in synchronism and phase with the shaft 2 of the signal producing instrument. Any change of phase or angular velocity between 147 and the signal producing instrument shaft 2 will immediately bring corrective action such as described above and should the signal producing instrument shaft 2 change to another constant angular velocity in the same or the opposite direction 147 will do the same and at any constant angular velocity of shaft 2 at the signal producing instrument the shaft 147 after cessation of corrective actions will have the same instantaneous angular displacement as that shaft 2. The valve 127—128 will only operate when there is a difference of phase between 147 and the shaft 2 of the signal producing instrument, a difference of phase clearly being caused by some change of angular velocity if only momentary. Clearly the instrument of Fig. 1 together with the devices of Figs. 6 and 8 is means for instantaneously relating a spatial magnitude, i. e. the angular displacement of 147, to the $t/p$ ratio of a signal.

The angular displacement of the shaft 148 of the valve 139 in Fig. 8 is a magnitude which is clearly related to the angular velocity of the shaft 147 but angular velocity is the rate of change of angular displacement or the first differential coefficient with respect to time of angular displacement. The angular displacement of 148 may be linearly related to the angular velocity of 147 by suitable shaping of the valve opening, e. g. by the shaping of the annular groove segments in 128, provided the torque of the engine 146 is appreciably greater than the resistance of any load on 147. Angular displacement of 148 is a magnitude and like any other magnitude it can be related to a $t/p$ ratio by the instrument of Fig. 1 by coupling 148 to the shaft 2 of that instrument.

The valve 139 as it is capable of differentiation in one case should be capable of extracting any one differential coefficient with respect to time, e. g. angular acceleration, rate of change of angular acceleration and so on. This may be accomplished by using a plurality of 139 valves in an arrangement such as that of Fig. 8 the first 139 valve directly controlling 146 and being itself controlled by the second 139 valve in the same manner as the 127—128 valve controls 139 in Fig. 8 by supplying fluid to the cylinders 142 and 143, that second 139 valve would in turn be controlled by a third such valve and so on the last of the 139 valves being controlled by the 127—128 valve. With one 139 valve there is instantaneous equality of angular displacements of the shaft 147 and the 2 shaft of the distant transmitter when angular velocity is constant, with two 139 valves there would be that equality with constant angular acceleration, with three 139 valves there would be that equality with a constant rate of change of angular acceleration, with four 139 valves there would be that equality with constant acceleration of the angular acceleration and so on. The angular displacement of the shaft 148 of any 139 valve is a magnitude which can be related to a $t/p$ ratio according to the invention and each would be a differential coefficient with respect to time and as such can be used in the invention for a number of useful purposes particularly in automatic computation.

The explanation of the invention hereinbefore has been limited to the most simple cases of signal production and signal use in indication and control by means of two sets of terminal apparatus between which is passed a single signal without consideration of any modification at any point between the two sets of terminal apparatus. Furthermore the instruments described have been of the most simple universal kinds limited to a minimum of geared stages in Fig. 1 and the minimum number of valves of simple character in Fig. 8. This has been done in order that the nature of the signal and precision and the general means for producing, conveying between instruments and using such signals and precision shall be more readily comprehended but the invention is not limited to such simple cases and apparatus as it embraces within its scope a large number of complex systems each of which performs one or a plurality of processes in automatic computation, such as a plurality of signal producing instruments as in Fig. 1 the signals of which are resolved into components, combined, modified, separated, recombined and/or changed in innumerable ways before use by one or a plurality of instruments as in Fig. 1 for simple indication or with the addition of Fig. 6 or Figs. 6 and 8 for control each of which reproduces a magnitude which may or may not be similar to any of the magnitudes related to the original signals; and one signal producing instrument the signal of which is modified, resolved into components which are modified, combined, separated, resolved into components, recombined and/or changed in a variety of ways before use by one or a plurality of the indicating or controlling arrangements hereinbefore described each of which reproduces a different magnitude none of which may be the same as the original magnitude related to the first signal. No useful purpose can be served by describing in detail all or any one of such complex systems for each would comprise pluralities of the instruments and devices herein described and illustrated by the drawing by way of example and each would be designed for a particular purpose or service to perform a required kind of automatic computation, indication and control. Such complex systems however depend on modification and/or combination of signals, exactly as ordinary computation consists of modification and/or combination of numbers or symbols capable of numerical evaluation, and these will now be described.

There are four principal changes that can be made in signals which amount to multiplication, division, addition and subtraction of the $t/p$ ratio of signals and therefore of the magnitudes represented by the ratios. Fig. 9 shows graphically how division and multiplication can be achieved, 149 and 150 being the two component trains of impulses of a signal. Taking 150 as the reference component then in one common cycle of both components the impulse of 149 lags behind the impulse of 150, i. e. there is a minus $t$ interval of time, and the time interval is measured on the time-scale given by the period $p$ of the common cycle of the two components in which the time interval is measured. As previously explained a magnitude is represented by the ratio minus $t/p$ and the period of successive common cycles of the two components may vary continuously and erratically without altering the ratio $t/p$ so long as the magnitude is the same so that only change of magnitude will cause change of $t/p$, e. g. in Fig. 1 the oscillator 40 may be unstable without affecting $t/p$. The reason for this is to be found in the phase-displacers 10—11 and 12—13 in Fig. 1 for the windings of 11 are distributed through 360 degrees which is a spatial dimension which is quite independent of time and one cycle of variation of magnetic field strength produced by the windings is always exactly equal to 360 degrees whether the frequency of supply to 11 is very low or infinitely high for frequency only decides the angular velocity of the rotating magnetic field. The same is equally true in 10 and any angular displacement $d$ is also a spatial magnitude so that $d/360$ degrees which becomes related to time as the ratio $t/p$ because of the angular velocity of one rotating magnetic field which traverses d, 10 and 11 equally.

In Fig. 9 if every second impulse of 149 and of 150 is suppressed then 149 becomes 151 and 150 becomes 152. Within the limits of precision of the signal the periods of two successive cycles of 149 and of 150 are equal and therefore the period of a common cycle of 151 and 152 is twice that of one cycle of 150 but in that common cycle the time interval of displacement of the impulse of 151 from that of 152 is exactly the same as the time interval between an impulse of 149 from an impulse of 150 in a common cycle which is $t$ but the period of 151—152 is $2p$ if $p$ is the period of 149—150 and therefore the ratio $t/(2p)$ of 151—152 is one half of the ratio $t/p$ of 149—150 and if the ratio is one half then the magnitude represented by 151—152 is one-half of the magnitude represented by 149—150, i. e. there has been division. Division by any integer may be accomplished in the same way by separating the two components of a signal and without disturbing the phase relation of the components selecting an equal sub-multiple frequency of each which suppresses some impulses, for example as 45 in Fig. 1 suppresses some impulses which would otherwise be produced by 46.

It will be evident that instead of selecting a sub-multiple of each component of the signal a harmonic may be selected and used to add impulses to the component and if this is done with the two separated components of a signal then there will be multiplication of the $t/p$ ratio and therefore of the magnitude represented thereby. This is shown in Fig. 9 in which the component 149 becomes the component 153 which is the third harmonic of 149 and 150 becomes 154 which is also the third harmonic of 150 the time interval between the impulse of 153 and the impulse of 154 in a common cycle of 153—154 being exactly equal to the corresponding interval $t$ in the 149—150 signal but in the 153—154 signal the period of the common cycle is $p/3$ if $p$ is the period of the common cycle in the 149—150 signal and therefore the ratio of 149—150 is $t/p$ compared to the ratio $3t/p$ of 153—154, i. e. a multiplication by 3 not only of the ratio but also of the magnitude represented by 153—154 relative to the magnitude represented by 149—150.

By a combination of division and multiplication as above described it is possible to obtain a signal which represents a magnitude which is equal to the magnitude represented by the initial signal multiplied by any fraction, i. e. any ratio of the two magnitudes can be readily obtained.

The maximum value of a magnitude which can be represented in a signal according to the invention is strictly limited for $t$ cannot be allowed to become greater than $p$, if it does then the ratio representing the magnitude will be $(xp-t)/p$ in which $x$ is any positive or negative integer and the signal will not contain any information relating to $x$. In multiplication as described above and in addition as hereinafter described it is important that magnitudes shall be represented by $t/p$ ratios in which $t$ is sufficiently small relative to $p$ so that in ratios representing the resulting products or sums $t$ shall be smaller than $p$. This is easily arranged when the magnitudes are first related to $t/p$ ratios of signals, for example in Fig. 1 an angular magnitude which at no time will exceed 360 degrees instead of being applied to the shaft 2 may be applied to the shaft 2a in which case the resulting $t/p$ ratio of the signal cannot exceed the ratio of the angular movement of 2 relative to that of 2a. Again signals with which multiplication, division, addition and subtraction are to be performed may first be divided by a common factor in the manner described above and the final result multiplied by that factor.

A signal representing the sum or difference of two magnitudes can be readily obtained from combination of the two signals representing those magnitudes provided the signals have a common component by separating the components of each signal and, neglecting the common component, the two uncommon components are combined to form a new signal which will represent the sum or difference of the magnitudes. This will be understood from Fig. 10 in which 155—156 is a signal representing one magnitude and 155—157 is the signal representing the other magnitude, the component 155 being common to both, i. e. 155 is produced by one oscillator so that frequency, phase and variations thereof are identical in both signals. Let it be assumed that the positive time interval 160 is related to the magnitude in the 155—157 signal and the time interval 161, also positive, is related to the magnitude in the case of the 155—156 signal then period $p$ being common to both signals because 155 is common the ratio 160/$p$ of the 155—157 signal and the ratio 161/$p$ of the 155—156 signal become a ratio of (160—161)/$p$ in a signal 157—156, i. e. the ratio 162/$p$ of the 158 signal represents a magnitude which is the difference of the magnitudes represented by the 155—156 and 155—157 signals. The component 156 may be readily separated from the signal 155—156 and the component 157 from the signal 155—157 by rectifiers 157 being reversed and combined with 156 to form the signal 158.

The time interval 162 of the signal 158 is positive and equal to the difference of the two positive time intervals 160 and 161 and the combination of 156 with 157 to form a new signal will always result in a time interval which is the difference of the time intervals of the 155—156 and 155—157 signals, e. g. if 160 and 161 are both negative then 162 will be negative and the difference of 160 and 161. This being so it follows that if one signal 155—157 has a negative time interval such as 163 and the other signal 155—156 has a positive time interval such as 161 then the result of combining 156 and 157 to form a new signal 159 means that the latter will have a time interval 164 which is the sum of 161 and 163 and therefore the ratio 164/$p$ is equal to (161—163)/$p$ and represents a magnitude which is the sum of the magnitudes represented by the signals 155—156 and 155—157. The $t/p$ ratio of a signal may be made positive or negative at will for addition or subtraction as described above by the reversing switch 16 in Figs. 1 and 2.

Addition and substraction by combination of signals may also be performed in cases when there is not a common component of those signals provided the signals have a common timescale and a constant $t/p$ ratio of one component of one signal and one component of the other signal, i. e. there is a constant phase displacement between those components and both are produced by the same oscillator. Such would be the case in Fig. 10 if the 155 component of the 155—156 signal had a constant time interval of displacement from the 155 component of the 155—157 signal other things being the same. If that constant time interval is subtracted from the 156 component then it may be combined with the 157 component to form a signal with a $t/p$ ratio representing the sum or difference of the magnitudes represented by the 155—156 and 155—157 signals. This can be accomplished by the instrument 1 of Fig. 1 used as previously described as a receiver in remote indication, i. e. the terminals 17 connected to terminals 20 and terminals 23 connected to terminals 26. First the 155 component of the 155—157 signal would be applied to the terminals 34 and the 155 component of the 155—156 signal would be applied to terminals 31 and with switch 38 in correct position an indication would be provided by the tubes 36 and 37 of the time displacement of those components. By adjusting 27 and 28 the indication can be reduced to zero in 36 and 37 at which the 155 components are disconnected and the 156 component of the 155—156 signal is applied to the terminals 34 and the component appearing at terminals 31, which is the 156 component with the constant time displacement subtracted, combined with the 157 component to form the new signal having a $t/p$ ratio representing the sum or difference of the original magnitudes.

Precision in addition and subtraction by combination of signals essentially requires that all of the signals are directly or indirectly controlled by one master oscillation or train of impulses in order that the time-scales of all signals be identical. It is possible to combine signals as described for addition and subtraction which are not controlled by a master oscillation provided frequency and phase of the separate signals are closely controlled but the possible precision is very limited. When the frequency and phase and variations thereof of one component of each of two signals are not locked together then at least one of the signals must be converted. Such conversion means that the magnitude represented by the $t/p$ ratio of the signal shall be reproduced and then again related to the $t/p$ ratio of a new signal which is produced by using one component of the second signal. Reproduction of the magnitude requires a control arrangement such as Fig. 1 the shaft 2 of which is coupled to the shaft 147 of the arrangement of Fig. 8 with the Fig. 6 arrangement providing a differential response for controlling the Fig. 8 arrangement. The shaft 147 of this remote control arrangement would also be coupled to the shaft 2 of a second Fig. 1 instrument used as a signal producer, to the terminals 34 of which would be applied one component of the signal the $t/p$ ratio of which represents a magnitude which it is desired to add to or subtract from the reproduced magnitude and the resulting sum or difference will be related to the $t/p$ ratio of of a new signal formed by combining the remaining component of the former signal with the component appearing at the terminals 31 of that signal producer.

In some cases magnitudes which are to be added or subtracted have adjacent signal producers such as Fig. 1 in which case the terminals 30 of both instruments or the terminals 29 of both instruments may be connected together so that their oscillators are locked in frequency and phase by a train of impulses in the former case and by the fundamental oscillation in the latter case. Thereafter the combination of the train of impulses at the terminals 31 of one instrument with the train of impulses at the 31 terminals of the other instrument will produce a signal in the manner described in connection with Fig. 10 which represents the sum or difference of the two magnitudes at will by using the switch 16 of one of the instruments.

When the signal producers of two magnitudes which are to be added or subtracted are some distance apart then the signal from the terminals 32 of one signal producer as in Fig. 1 may be applied to the terminals 33 of the second signal producer also as in Fig. 1 so that the component thereof appearing at the terminals 34 of the second signal producer controls its oscillator 40 and the combination of the trains of impulses appearing at the terminals 31 and 35 of the second signal producer will provide a signal the $t/p$ ratio of which represents the sum of difference of the two original magnitudes, according to the position of the switch 16 of the second signal producer, the combination of the trains of impulses being in the manner shown in Fig. 10 with one position of the switch 39 of the second signal producer. With the other position of that switch 39 the combination of the trains of impulses will be as shown in Fig. 11. In Fig. 10 if the magnitudes represented by 155—156 and 155—157 are both varying then the phase of both components of the combined signal 158 or 159 will be unstable and therefore such a combined signal cannot be combined with another signal for addition or subtraction as shown in Fig. 10 but the combined signal resulting from addition or subtraction as shown in Fig. 11 can be directly combined with another signal in the manner of Fig. 10, i. e. two pairs of magnitudes may be represented by two combined signals as in Fig. 11 and then those two signals may be directly combined in the manner of Fig. 10 so that four magnitudes can be readily added and/or subtracted.

In Fig. 11 the signal 165 has its negative component stable its positive component varying in phase with variation of the magnitude represented by the signal, i. e. with the time interval 168. That positive component is applied to the terminals 34 of a signal producer such as Fig. 1 which produces the signal 166 representing another magnitude so that the negative component of 166 is always in the same instantaneous phase as the positive component of 165 whatever the time interval 169 between the two components of 166 may be and whatever the time interval 168 between the two components of 165 may be. By combining the negative component of 165 with the positive component of 166 a signal 167 is formed having a time interval 170 between its components which is the sum of the time intervals 168 and 169 and therefore 167 represents a magnitude which is equal to the sum of the two magnitudes represented by 165 and 166. If the positive component of 165 is used to form a signal 171 which has a negative time interval 173 between its components then the negative component of 165 combined with the positive component of 171 will form a signal 172 which has a time interval 174 between its components which is the difference of the time intervals 168 and 173 and therefore 172 represents a magnitude which is equal to the difference of the two magnitudes represented by the signals 165 and 171.

Fig. 12 shows an example of the kind of apparatus for changing the frequency of a train of impulses by producing a new train of impulses at a harmonic or sub-harmonic frequency of the first train of impulses such as is required in multiplication and division as hereinbefore described with reference to Fig. 9. The devices of Fig. 12 are chiefly the same as devices shown in Fig. 2 and are similarly connected in a circuit as shown in Fig. 5, i. e., devices as used in the instrument 1 of Fig. 1, and comprise a multi-oscillator 40 of known kind which supplies oscillations to phase-splitters 41 and 43 at different frequencies but in harmonic relation. The instrument 41 supplies polyphase oscillations to a phase adjusting device 27 the output terminals 20 of which are connected to the deflecting plates of a cathode-ray tube 47 of the kind shown in Fig. 3 a circular sweep being produced therein at the frequency of the polyphase oscillations applied to its deflecting plates. Similarly the instrument 43 supplies polyphase oscillations to a phase adjuster 28 to the terminals 26 of which are connected the deflecting plates of another cathode ray tube 48 which is also of the kind shown in Fig. 3 a circular sweep being produced therein at the frequency of the polyphase oscillations supplied by 43. The frequency of sweep of 47 is lower than that of 48 and the two cathode-ray tubes are otherwise connected as shown in Fig. 5 the tubes 47 and 48 co-operating to produce a train of impulses across the resistor 86 and terminals 30 the frequency of the impulses being equal to that of the sweep of the tube 47 and the duration of each impulse is that of those in the target electrode circuit of 48. In Fig. 12 a signal is applied to the terminals 175 and only one component of the signal passes through the rectifier 176 the other component therefore being confined to the resistor 177 connected across the terminals 175. The component of the signal which passes through 176 is applied to the terminals 34 of 40 and therein controls the frequencies and phases of oscillations supplied to 41 and 43. The train of impulses applied to 34 is a cosine series of harmonic frequencies the fundamental of which is at the frequency of those impulses and therefore if the frequencies of oscillations supplied to 41 and 43 are harmonics of that fundamental those oscillations are locked in time-phase and harmonic frequency relation to each other by the control of the train of impulses which is precisely what is required in multiplication as described with reference to Fig. 9. If the frequency of the oscillation supplied to 41 by 40 is to be a sub-multiple of the said fundamental, i. e. as is required in division as described with reference to Fig. 9, then that oscillation is produced from and controlled in frequency and phase by de-multiplication in 40 of the train of impulses applied to 34 in the well known manner so that in this case also the oscillations supplied to 41 and 43 are locked in time-phase and harmonic frequency relation to each other by the control of the train of impulses applied to 34.

The oscillator 40 in Fig. 12 may be provided with a selector control in the well known form so that the frequency of the oscillation supplied to 41 can be adjusted at will to be any one of a number of sub-harmonic and/or harmonic frequencies of the fundamental of the train of impulses applied to the terminals 34 so that division and/or multiplication by one of a number of integers is possible by use of the selector control. An arrangement such as that of Fig. 12 is not limited to the use of two tubes such as 47 and 48, one or three or more according to the precision required. In division and multiplication as previously described two arrangements such as Fig. 12 would be required one for each component of the signal and the time-phase produced by each of the arrangements can be checked by use of the Fig. 1 instrument as a remote indicator the signal to be changed being applied to the terminals 33 thereof and first one and then the other of the new components applied to the terminals 31 with the switch 39 first in one position and then in the other so that the appropriate component of the signal controls the sweeps of the tubes 36 and 37, differences of time-phase between a new component and its corresponding component of the initial signal being corrected by adjustments of 27 and 28 of the Fig. 12 arrangements. The instrument of Fig. 12 constitutes a means for converting a signal by independently changing the frequencies of the components of that signal.

Some systems according to the invention may require the conveyance of two or more signals, say between a signal producing station and an indicating or control station, the signals representing magnitudes which because of variation or other reasons cannot be combined as one magnitude represented by one signal. Each of the plurality of signals would in such a case require an individual channel and several channels besides being inconvenient may result in loss of relative precision between the signals and therefore of magnitudes reproduced therefrom, for example the electrical constants of the channels may be different. A special case in which a plurality of signals is necessary arises when extreme precision is required and frequencies and the limitations of transmission channels are such as render that precision impossible in one simple signal. In the instrument of Fig. 1 the number of tubes such as 45 and 46 which co-operate in producing one train of impulses which can be used is limited by the frequency of sweep of the last tube and the ability of a transmission channel to convey the resulting short duration impulses without broadening them for that would destroy precision. For example if the tube 45 has a sweep frequency of ten cycles per second and in each such tube the period of sweep is 100 times greater than the duration of the impulse produced in its target electrode circuit then the gearing between stages may be 100 to 1 so that if the period of sweep in the first tube is 0.1 second the period of sweep in a second tube will be 1 milli-second, in a third tube 10 micro-seconds and the duration of impulses in the third tube would be 0.1 micro-second. Suppose the transmission to be used is only capable of dealing with impulses of 10 micro-seconds duration and the precision required would necessitate the use of four such tubes then two Fig. 1 instruments may be used the shaft 2a of the first geared to the shaft 2 of the second instrument the terminals 30 of the two instruments being connected so that the oscillations of both instruments are locked in phase and frequency then each instrument will provide a signal at its 32 terminals and both signals will contain information relating to the same magnitude. If each instrument has two geared stages and the tubes throughout have a 100 to 1 ratio of sweep to impulse then the time interval of the signal of the first instrument represents the magnitude to an accuracy of 10 micro-seconds if the period of sweep of its first tube is 0.1 second but the signal of the second instrument contains additional information relating to that time interval to an accuracy of 0.001 micro-second, i. e., it measures from 0.001 to 10 micro-seconds, though its impulse duration is 10 micro-seconds and the second instrument uses the same frequencies as the first instrument. The time-scale of the ratio $t/p$ of the signal of the first instrument is 10,000 greater than the time-scale of the ratio $t/p$ of the signal of the second instrument. Still greater precision can be obtained by gearing a third instrument to the second instrument and so on.

A plurality of signals without losing individuality may be combined to form one signal provided that one component of each signal is in locked time-phase with one component of each of the other signals. This is accomplished by non-interfering interspersal of impulses of the components of the several signals which are not in locked time-phase. The method will be better understood from Fig. 13 in which 178 and 179 are two signals the negative components of which are identical as they would be if locked in phase and frequency. The positive components of 178 and 179 are shown with alternate impulses suppressed in order that the method of combination shall be clearly understood though before such suppression there would be a positive impulse in each cycle of the negative component in each signal. Suppose that the time interval which is related to the magnitude in each signal is positive that is measured to the right of the negative impulse of 178 and 179 in the drawing then as previously explained a positive impulse cannot move out of its immediate cycle of the negative component whatever the value of the magnitude represented by the signal. The positive impulses suppressed in 178 are in cycles of the common negative component in which the remaining positive impulses of 179 occur and the suppressed positive impulses in 179 are in cycles of the common negative component in which the remaining positive impulses of 178 occur and therefore as the positive impulses cannot move out of their immediate cycles of the common component the remaining positive impulses of 178 and 179 may be added to form the positive component of the signal 180. The signals 178 and 179 as shown may be directly added so that in effect odd cycles of the original signal from which 178 is obtained by suppression of alternate positive impulses are combined with even cycles of the original signal from which 179 was obtained by like suppression and in the combined signal the $t/p$ ratios of the two original signals are retained for they appear alternately. In a direct addition of 178 to 179 the common negative component would be retained and there would be no indication showing which of the two $t/p$ ratios is related to the magnitude which was represented by the original signal of 178 or of 179. For this reason the negative component of the combined signal 180 is the negative component of 178 with alternate impulses suppressed in cycles in which its positive impulses are suppressed and therefore it is clear in 180 that positive impulses occurring in the first half cycle of its negative component are those from the 178 signal and positive impulses in the second half cycle of that negative component are from the 179 signal.

It will be appreciated that the preparation of signals for combination by interspersal as above described consists of dividing the frequency of each component of one signal by 2 if two signals are to be combined, by 3 for three signals and so on and the uncommon component of each of the other signals has its frequency divided by 2, 3 or so on according to the number of signals to be combined but the time-phases of the divided signals and the other positive components are not the same, i. e. with two signals combined the second is displaced 180 degrees relative to the first signal in the combination and with three signals the second is displaced 120 degrees and the third 240 degrees relative to the first and so on the relative phase displacement of successive signal components in the combination being 360 degrees divided by the number of signals combined. In this way each component train of positive impulses in the combined signal has an individual phase-range in which it can vary according to variation of the magnitude it represents in that signal and none of those phase-ranges overlap adjacent phase-ranges. Provided there is no overlap of phase-ranges it is not necessary that the phase-ranges be equal and in cases where in original signals the positive component may be displaced positively or negatively from the negative component it is necessary that such displacement be limited so that there is no overlap of phase-ranges in the combined signal. This is shown in Fig. 13 where 181 and 182 are signals in each of which positive impulses may be displaced either way from the negative impulses but positive displacement in 181 plus negative displacement in 182 or vice versa must not exceed 360 degrees, in fact it is preferable that the sum of those displacements be always less than 360 degrees. The signal 181 is shown with a negative displacement and 182 with a positive displacement so that in the combined signal 183 two positive impulses occur in the one period of the common negative component of 181 and 182 but there will be no interference provided displacements in 181 and 182 are properly limited.

Fig. 14 which is generally similar to Fig. 2 shows the kind of instruments required for combining signals by interspersal one of the three similar instruments 184, 185 and 186 being used for changing the frequency of the component which is common to all of the signals to be combined, say 184, and 185 and 186 being used for equal changing of the other components of two signals which are to be combined. If there are three or more signals to be combined then one extra instrument for each signal above two will be required in addition to the three shown in Fig. 14. The common component of the signals, obtained by rectification such as is described with reference to Figs. 5 and 12, in such a case would be applied to the terminals 187 of 184 and the other component of one of the signals would be applied to the terminals 188 of 185 and the other component of the second signal would be applied to the terminals 189 of 186. The instrument 185, which is similar to one component producing part of Fig. 2 and is identical with 184 and with 186, consists of a multi-oscillator such as 40, two phase splitters such as 41 and 43 and two phase adjusters (190 and 191) such as 20 and 26 in Fig. 2, and has the fundamental frequency of the train of impulses applied to its terminals 188 controlling the frequency and phase of two ocsillations in harmonic relation produced by the multi-oscillator one of which has a desired sub-multiple frequency relative to the frequency of the train of impulses applied to 188, the phase of which is controlled by a phase control 190, the phase of the other oscillation being controlled by the phase control 191 and the sub-multiple frequency is selected by the control 192 of known kind. A polyphase oscillation at the sub-multiple frequency is applied to the deflector plates of a cathode-ray tube 193 of the kind shown in Fig. 3 and polyphase oscillations at the harmonic frequency phase controlled by 191 are supplied to the deflecting plates of a similar cathode-ray tube 194. Circular sweeps are produced in the tubes 193 and 194 at the sub-harmonic and harmonic frequencies respectively, 193 and 194 being connected in circuits and co-operating to produce one train of impulses in the same manner as 45 and 46 or 47 and 48 as shown in Fig. 5 and described in reference thereto.

Each of the instruments 184, 185 and 186 may have one, three or more cathode-ray tubes such as 193 and 194 with sweeps at different frequencies in harmonic relation according to the precision of the signals used therewith. The trains of impulses produced co-operatively by the tubes of each of the instruments 184, 185 and 186 are then combined to form one signal as described with reference to Fig. 13, i. e. the new common component is, say, that produced by 185 and is the negative component and the other new components produced by 184 and 186 respectively form together the interspersed positive component of the signal. Fig. 14 therefore consists of three simplified instruments 1 of Fig. 1 as further explained by Figs. 2 and 5 the simplification in each being that the instrument does not contain the tubes 36, 37, 47 and 48 nor the individual circuits thereof but has added a frequency selector, such as 192 in Fig. 14, to the multi-oscillator 40.

The arrangement of Fig. 14 as described above generates new trains of impulses the duration of the impulses may therefore be shorter than the duration of impulses of the original components and because of the separate instruments 184, 185 and 186 with their individual phase adjustments signals with unequal phase ranges may be readily combined by interspersal so that the arrangement of Fig. 14 is of general utility. Combination by interspersal can, however, be accomplished by suppression of impulses as described with reference to Fig. 13 and this can be accomplished by more simple means particularly in cases where the signals have equal phase-ranges. For this purpose all that is required is one instrument, say 185, of the Fig. 14 arrangement which uses a modified cathode-ray tube 194. The modification is solely a matter of the shape of the target electrode 52 in Fig. 3 in the plane of sweep that shape being a sector of a circular disc the angle of which is 360 degrees divided by the number of signals to be combined, preferably that angle less the angular size of the focused spot of cathode rays in the tube. One such modified tube would be required for each signal to be combined and the instrument 185 in Fig. 14 would have the common component of the signals applied to its terminals 188, the appropriate sub-harmonic thereof would be selected by 192 and polyphase oscillations at the sub-harmonic frequency would be supplied to the deflecting plates of each tube the phase of sweep in each tube being adjusted by an individual phase-adjuster such as 191. The tube 193, which may be unmodified as described above has the common component of the signals applied to its target electrode cathode circuit across one of two resistors in series therein. As the frequency of sweep in 163 is a sub-harmonic of the common component then by adjustment of 190 only one impulse per cycle of sweep will be permitted to flow from the target electrode to the cathode in 193 so that across the other of the said two resistors in the target electrode circuit would appear a train of impulses at the sub-harmonic frequency, i. e. some of the impulses of the common component are suppressed. In exactly the same way the uncommon component of one of the signals to be combined by interspersal would have some of its impulses suppressed in the tube 194 which has a sector target electrode which permits phase change of the unsuppressed impulses in accordance with change of the magnitude represented by it and which impulse of the component in the cycle of sweep shall not be suppressed can be selected by adjustment of 191. Each of the signals to be combined would require an independent tube such as 194 for suppression of some of the impulses of its uncommon component and each such tube would have the sub-harmonic frequency of sweep and an individual phase-adjuster such as 191.

The plurality of cathode-ray tubes 194 with sector target electrodes as described in the last paragraph above may be replaced by a single cathode-ray tube which has a plurality of independent target electrodes arranged in a ring coaxial with the sweep of the cathode-ray beam in the tube each of those electrodes being shaped as a sector of the ring with a small gap between adjacent electrodes in the plane of the ring and therefore in the plane of the sweep. Such a tube would be connected as is 194 in Fig. 14 to 185 and supplied with polyphase oscillations at the sub-harmonic frequency which is supplied to 193 phase controlled by 191. Each uncommon component of the signals to be combined would be applied to an individual target electrode circuit of the tube impulses of the component being suppressed as described in the last paragraph above.

Separation of the individual signals from a combined signal such as 180 in Fig. 13 is readily accomplished by the apparatus of Fig. 14 the negative component of 180 being applied to the terminals 187 of 184 which supplies polyphase oscillations to one cathode-ray tube at a harmonic of the frequency of that component equal to the frequency of the original common component of the signals, i. e. the negative component of 178 and 179 in Fig. 13, and higher different harmonic frequencies of polyphase oscillations to each other cathode-ray tube connected to 184 all of the tube co-operating as previously described to produce a new train of impulses at the frequency of that original common component. The negative component of 180 would also be applied to the terminals 189 of the instrument 186 and polyphase oscillations at the frequency of that component produced and applied through the phase-adjusters to a plurality of cathode-ray tubes each having a sector target electrode or through one phase-adjuster to one tube having a plurality of target electrodes as described above. The positive component of 180 would be applied to the grid of each tube and in each target electrode circuit would appear one individual component of an original signal, e. g. the positive component of 178 as shown in Fig. 13, each of which combined with the new common component reproduces one of the original signals separated from the others. Fig. 14 is a means for interspersing a plurality of signals and is also a means for separating individual signals from an interspersal of a plurality thereof.

The signal used in the invention as previously described herein has consisted of a negative train of impulses combined with a train of positive impulses in the case of a simple signal and in the case of a compound signal a train of negative impulses combined with a plurality of interspersed trains of positive impulses the frequencies of trains of impulses in one signal being equal or in harmonic relation to each other. The essential requirement is that the component trains of impulses shall be distinct and this may be achieved by differences of polarity, intensity and/or of phase of phase-ranges of the component trains of impulses. Again, though signals which consist wholly of trains of impulses are in general the most precise it is possible to form a satisfactory signal for some purposes, e. g. within individual instruments of a system, by combining one or more than one train of impulses with one oscillation or with a plurality of oscillations of different frequencies, for example in Fig. 1 the train of impulses at the terminals 31 may be combined with the oscillation at the terminals 29. In all of these cases distinctness of components of a signal can be achieved by keeping components separate instead of or in addition to the other methods of achieving distinctness.

It is not essential in the invention that sweep in any cathode-ray tube be circular, i. e. angular, for linear sweep may also be used with the advantage that only one single phase oscillation is required for producing the sweep and only one pair of deflecting plates or coils per tube but the circular sweep gives higher precision. Magnetic phase-displacers such as 10—11 in Fig. 1 are not essential in the invention for electrostatic displacers of well known kinds may equally be used nor is it essential that movement in phase-displacers be angular for the primary and secondary of a displacer may be distributed linearly in known manner so that linear movement of primary relative to secondary produces phase change. Angular movements are, however, more simple, precise and universal but this means that magnitudes which are not angular must be converted into angular magnitudes before they can be related to a $t/p$ ratio of a signal and in reproduction they are first reproduced as angular magnitudes and then converted into original form if apparatus such as that of Fig. 1 is used. The means required for such conversions is relatively simple some examples being illustrated in Figs. 15, 16 and 17 and others will be readily obvious to skilled persons. Some magnitudes such as temperature, pressure, electric voltage and current and the like which are not spatial magnitudes must also be related to spatial magnitudes, for instance by means of known measuring devices for such magnitudes, before they can be related to a $t/p$ ratio of a signal.

In Fig. 15 a frame 195 has slidably mounted therein a bar 196 which has a needle 197 under pressure of a spring 198 engaging in a groove 199 of a drum 200 the shaft 201 thereof being parallel to 196 and having bearings in 195. The groove 199 is a helix of uniform pitch and therefore the device of Fig. 15 is a means for linearly relating a linear magnitude of movement of 196 to angular displacement of 201 so that by coupling 201 to the shaft 2 of the instrument of Fig. 1 a linear magnitude can be related to a $t$-$p$ ratio of a signal or reproduced therefrom.

In Fig. 16 a shaft 202 having bearings in 195 carries a drum 203 which has a groove 204 in which engages one needle 197 of the bar 196 which is parallel to 202 and slidably mounted in the frame 195. The groove 204 bounds an elliptical plane in the drum 203 the edge of which is at every point thereof in the cylindrical surface of 203 and therefore if at zero angular displacement of 202 the needle 197 is midway between the limits of its traverse the linear magnitude of movement of 196 will always be equal to the sine of any angular displacement of 202 and if with 197 in the said mid-position angular displacement of 202 is 90 degrees then the linear magnitude of displacement of 196 will always correspond to the cosine of the angular displacement of 202. If displacement of 196 is always measured downwards in the drawing from its upper limit of movement then in those two cases the linear magnitude of displacement of 196 corresponds to the versed sine and coversed sine respectively of the angle of displacement of 202.

The second needle 197 in Fig. 16 engages in a groove 205 of a drum 206 fixed to the shaft 207 which has bearings in the frame 195 and is parallel to 196 and 202. The groove 205 is a helix having one full turn in an axial distance equal to the total possible movement of 196 and the helix has a continuous logarithmic change of pitch in 360 degrees thereof and therefore angular displacement of 207 always corresponds to the logarithm of the linear magnitude of displacement of 196 and, as 196 and 197 couple 203 and 206, the angle of displacement of 207 always corresponds to the logarithm of the versed sine or coversed sine of the angle of displacement of 202. If the helix 205 has one full turn in the lower half of the total movement of 196 and a similar helix but of reversed pitch and of opposite hand is joined to the first helix, i. e. the point of join of the two helices is axially in the mid-position of 196 and the helices change logarithmically from the join one to one end of 206 and the other to the other end of 206, then the angle of displacement of 207 will always correspond to the logarithmic sine or cosine of the angle of displacement of 202.

In Fig. 17 the bar 196 carrying two needles 197 is slidably mounted in the frame 195 in which are bearings for the shaft 208 which is parallel to 196 and which has fixed to it the drum 210 which has a helical groove 209 of one turn and uniform pitch in which engages one needle 197, the other needle 197 engaging in a groove 211 of a drum 212 fixed to the shaft 213 which is parallel to 196 and to 208 and has bearings in 195. The groove 211 comprises a plurality of helices joined end to end each of which has one full turn in the same axial length and the pitch of the helices varies equally and logarithmically in the same direction of the axis so that the total angle of displacement of 213 corresponds to the logarithm of the linear magnitude of displacement of 196 from the zero position thereof. Clearly the total angle of displacement of 213 also corresponds to the logarithm of the angle of displacement of 210. Integral multiples of 360 degrees in the total angle of displacement of 213 measured positively or negatively representing the characteristic of the logarithm and the remaining angle less than 360 degrees of that total angle of displacement measured positively representing the mantissa of the logarithm. If the shaft 213 is coupled to the shaft 2 of one transmitter as in Fig. 1 and that shaft has a reduction gearing to the shaft 2 of a second such transmitter then the one transmitter will produce a signal representing the mantissa of the logarithm and the second transmitter will produce a signal representing the characteristic of the logarithm and the two signals may be combined by interspersal as described with reference to Fig. 13.

It will be evident that grooves in drums as shown in Figs. 15, 16 and 17 may have any desired shapes for the purpose of relating a linear or angular magnitude to an angular magnitude according to any mathematical function and it will be equally evident that a plurality of such converters may be coupled to each other for the same purpose, for example if a first converter as in Fig. 17 has its shaft 213 coupled to the shaft 208 of a second such converter then the angular displacement of the shaft 213 of the second converter will correspond to the logarithm of the logarithm of the angle of displacement of the shaft 208 of the first converter. Linearly relating the $t/p$ ratio of a signal to the logarithm of an original magnitude considerably extends the usefulness of multiplication and division as described with reference to Fig. 9 and addition and subtraction as described with reference to Figs. 10 and 11 for multiplication provides a $t/p$ ratio which is linearly related to the logarithm of a power of the original magnitude and division a $t/p$ ratio linearly related to the logarithm of a root of the original magnitude whilst addition or subtraction of two $t/p$ ratios which are linearly related to logarithms of original magnitudes produces $t/p$ ratios which are linearly related to the logarithm of the product or quotient respectively of the two original magnitudes. Devices such as shown in Figs. 15, 16 and 17 are means for relating one magnitude to another magnitude according to a mathematical function which can be used in any part of the system of automatic computation by coupling the shafts of Figs. 15, 16 and 17 to any of the shafts 2 and 2a of Fig. 1 and 147 and 148 of Fig. 8.

The examples of methods and means employed in systems according to the invention as described herein show the exceedingly wide utility of the invention. The scope of the invention ranges from the most simple system for indication, control or automatic computation to the most complex system which combines indication, control and automatic computation of the most involved kinds and comprises many instruments which are adjacent and/or widely separated and with separated instruments linked by any telegraphic kind of communication channel. In any system the general and/or instantaneous precision can be made as high as desired and any control can be powerful enough for moving with precision the largest bodies.

The mathematical processes in automatic computation are not dependent on the continued manipulations of one or more operators such manipulation being confined to initial adjustments of apparatus and thereafter the computation is wholly automatic and practically instantaneous or can be made so no matter how many constant and/or variable magnitudes enter into the computation and the mathematical processes which may be used in systems according to the invention are sufficient for the automatic, practically instantaneous and most precise solution of most problems in mathematical analysis and synthesis. The fact that systems for automatic computation are not limited by space or time means that any number of individual systems according to the invention may be linked to co-operate in the solution of important problems which hitherto could not be attempted because of the great amount of work involved.

I claim:

1. A discovery of automatic computation employing remote indication and control in which a magnitude is represented by an intermittent signal consisting of two distinct components so that each of a sequence of instantaneous values of the magnitude is related to an individual ratio of time intervals in a sequence thereof contained in said signal said two sequences and one said component having identical frequencies and each said ratio is that of the time interval between a variation of one component and one of a pair of successive variations of the other component to the time interval between said pair of variations said variation being intermediate in time to said pair of variations, each said component being produced by an individual generator, both generators being controlled by a common oscillator to maintain the frequency relation of the two components said representation being achieved by means for time displacing one component relative to the other to an extent that each said ratio corresponds to an instantaneous value of the magnitude, evaluation of the magnitude represented by such a said signal in indication and control as the converse of said representation being achieved by means for automatically adjusting the instantaneous value of a spatial magnitude to correspond to a ratio of time intervals in the signal.

2. A discovery of automatic computation employing remote indication and control in which a magnitude is represented by an intermittent signal consisting of two distinct components so that each of a sequence of instantaneous values of the magnitude is related to an individual ratio of time intervals in a sequence thereof contained in said signal said two sequences and one said component having identical frequencies and each said ratio is that of the time interval between a variation of one component and one of a pair of successive variations of the other component to the time interval between said pair of variations said variation being intermediate in time to said pair of variations, each said component being produced by an individual generator, both generators being controlled by a common oscillator to maintain the frequency relation of the two components the generator of one component comprising a plurality of impulse generators each of which is controlled in frequency and phase by an individual oscillation the plurality of said oscillations having their frequency relations maintained by said common oscillator said plurality of impulse generators being in a series arrangement in which one generator is controlled by the impulses of the preceding generator and the last generator in the series produces the said one component as a train of impulses the frequency of which is equal to the least common multiple of the frequencies of said plurality of oscillations and the duration of an impulse in said train is decided by the impulse generator operated at the highest frequency, said representation being achieved by means for time displacing one said component relative to the other which comprises means for relating the magnitude to a plurality of spatial magnitudes on individual scales each of which is the relative displacement between members of a phase displacing device individual to one of said plurality of oscillations a change of the magnitude thereby producing corresponding changes of phase of each of said plurality of oscillations and therefore a time displacement of said train of impulses relative to the other component of the signal so that change of said instantaneous values of the magnitude is automatically accompanied by corresponding change of the said ratios of time intervals.

3. A discovery as in claim 1 in which precision of evaluation of the magnitude represented by a signal in indication is achieved by means for automatically adjusting the instantaneous value of each of a plurality of spatial magnitudes to a ratio of time intervals in the sequence thereof contained in said signal each said spatial magnitude being on an individual scale.

4. A discovery of automatic computation employing remote indication and control in which continuous addition and subtraction of two magnitudes is automatically performed whatever the individual variations of those magnitudes by representing each magnitude by an intermittent signal consisting of two distinct components so that each of a sequence of instantaneous values of the magnitude is related to an individual ratio of time intervals in a sequence thereof contained in said signal each said ratio being that of the time interval between a variation of one said component and one of a pair of successive variations of the other component to the time interval between said pair of variations said variation being intermediate in time to said pair of variations, one component being common to both of the signals representing the said two magnitudes, separating the components of both signals and combining the uncommon components thereof to form a derived signal which represents a magnitude which is the result, said representation and addition and subtraction being achieved by a plurality of generators each frequency controlled by one common oscillator and producing one said component, means for time displacing one generated component relative to another so that each ratio of time intervals contained in the pair as a signal is related to the instantaneous value of one magnitude and like means for relating each said ratio of time intervals contained in a second pair of generated components to the instantaneous value of the other magnitude, one generated component being common to both pairs of said components, means for combining the uncommon components of the said pairs thereof to form a derived signal, the magnitude represented by said derived signal being evaluated by means for automatically adjusting the instantaneous value of a spatial magnitude to correspond to the ratio of time intervals contained in said derived signal.

5. A discovery of automatic computation employing remote indication and control in which continuous multiplication and division of a magnitude is automatically performed whatever the variation of that magnitude by representing the magnitude by an intermittent signal consisting of two distinct components, separating those components and independently changing the frequencies thereof to the same extent and recombining the frequency changed components to form a derived signal which represents a result magnitude which is the said magnitude multiplied by the ratio of the period between a pair of successive variations of one said component after frequency change to the period between a contemporary pair of successive variations of the corresponding component before that change, said multiplication and division being achieved by generators each of which produces one signal component said generators being frequency controlled by a common oscillator, means for time displacing one component relative to the other so that each of a sequence of instantaneous values of the magnitude is related to an individual ratio of time intervals in a sequence thereof contained in a signal of said two components each said ratio is that of the time interval between a variation of one component and one of a pair of successive variations of the other component to the time interval between said pair the said variation being intermediate in time to said pair of variations, a frequency changer for each said component which is frequency and phase controlled by that component and which produces a frequency changed component the pair of changed components forming the derived signal, the magnitude represented by the derived signal being evaluated by means for automatically adjusting the instantaneous value of a spatial magnitude to correspond to the ratio of time intervals contained in said derived signal as aforesaid.

6. A discovery of automatic computation employing remote indication and control in which each magnitude entering into and resulting from an operation of said automatic computation is logarithmically represented by an individual intermittent signal consisting of two distinct components, initial said representation of a magnitude being achieved by an individual generator for each component, both said generators being controlled in frequency by a common oscillator, means for automatically and logarithmically relating the magnitude to a spatial magnitude and means for automatically producing a time displacement between said two generated components so that each of a sequence of instantaneous values of said spatial magnitude is related to an individual ratio of time intervals in a sequence thereof contained in a signal consisting of said generated components each said ratio being that of the time interval between a variation of one of those components and one of a pair of successive variations of the other component to the time interval between said pair the said variation being intermediate in time to said pair of variations, the evaluation of the magnitude logarithmically represented by such a said signal being achieved by means for automatically adjusting the instantaneous value of a spatial magnitude to logarithmically correspond to the ratio of time intervals contained in that signal as aforesaid.

7. A discovery of automatic computation employing remote indication and control in which a magnitude entering into an operation of said automatic computation is represented according to a mathematical function by an intermittent signal consisting of two distinct components, said representation being achieved by an individual generator for each component, both said generators being frequency controlled by a common oscillator, means for automatically relating the magnitude to a spatial magnitude according to said mathematical function and means for automatically producing a time displacement between said two generated components so that each of a sequence of instantaneous values of said spatial magnitude is related to an individual ratio of time intervals in a sequence thereof contained in the signal consisting of said generated components each said ratio being that of the time interval between a variation of one of those components and one of a pair of successive variations of the other component to the time interval between said pair of variations the said variation being intermediate in time to said pair of variatons, the evaluation of the magnitude represented by such a signal according to a mathematical function being achieved by means for automatically adjusting the instantaneous value of a spatial magnitude to correspond according to said function to the ratio of time intervals contained in that signal as aforesaid.

8. A discovery of automatic computation employing remote indication and control in which the extraction of a differential co-efficient with respect to time of a varying magnitude is automatically achieved by means for representing said varying magnitude by an intermittent signal consisting of two distinct components so that each of a sequence of instantaneous values of said magnitude is related to an individual ratio of time intervals in a sequence thereof contained in said signal each said ratio being that of the time interval between a variation of one said component and one of a pair of successive variations of the other said component to the time interval between said pair of variations the said variation being intermediate in time to said pair of variations, like means for representing a first spatial magnitude by a second similar signal said two signals having a common component, a device for comparing the timings of the variations of the two uncommon components of the first said signal and of the said second signal and producing differential control impulses when there is time displacement between said uncommon components, a control device actuated by said differential impulses which differentially controls a first servo device for automatically adjusting a second spatial magnitude, said first servo device also differentially adjusting a servo control device which in turn differentially controls a second servo device for automatically adjusting the said first spatial magnitude thereby evaluating said varying magnitude, said second spatial magnitude being the extracted differential co-efficient with respect to time.

9. A discovery of automatic computation employing remote indication and control according to claim 1 in which a plurality of said signals are combined by interspersal into one intermittent signal and are subsequently separated by means frequency controlled by one common oscillator which produces the signals with one component common to all thereof, a frequency changer for said common component which increases the time interval between a pair of successive variations of that component after frequency change to be greater than the sum of time intervals between a number of successive variations of that component before frequency change, said number being the number of signals in said plurality thereof plus one, a frequency changer for the uncommon component of each signal of the said plurality thereof which increases the time interval between a pair of successive variations of the uncommon component to an extent equal to the change in the common component as aforesaid the plurality of frequency changers of said uncommon components at the same time unequally time displacing those uncommon components relative to said common component after frequency changes thereof so that the relative time displacement between a variation of each uncommon component and a variation of the common component is limited to an individual range of time displacements which in time does not overlap the individual range of any other uncommon component, the said common and uncommon components combined forming an interspersed intermittent signal from which any individual signal is separated by means for separating the common component from the interspersed plurality of uncommon components, an impulse generator frequency and phase controlled by the common component which reproduces the common component substantially as before and a second impulse generator frequency controlled by the common component through means for time displacement thereof said second impulse generator being also controlled by the plurality of uncommon components so that by adjustment of said means for time displacement only one of said plurality of components is effective and said second impulse generator reproduces only one of that plurality of uncommon components said reproduced common and uncommon components forming a separated signal which corresponds to one individual signal before said interspersal.

10. A system for automatic computation employing remote indication and control according to the discovery claimed in claim 1 in which apparatus for automatically representing a magnitude by an intermittent signal of two distinct components comprises a polyphase phase displacing device having a rotor and a stator said rotor having a shaft for mechanical coupling to a measuring device of the magnitude so that angular displacement of said rotor relative to said stator is related according to a mathematical function to that magnitude, two impulse generators each of which is a cathode-ray device having a source of electrons, a control electrode, an anode and a target electrode mounted inside an evacuated envelope with leads connected to the several electrodes insulated from each other and brought through and sealed in the wall of said envelope, means for applying operative electric potentials to each of said electrodes, means for focusing a beam of cathode rays in the plane of said target electrode and means for deflecting said beam to produce a periodically repeated sweep of the focused beam relative to said target electrode, an oscillator which supplies polyphase oscillations to the primary of said phase displacing device and to the deflecting means of one said cathode-ray device the secondary of that phase displacing device being connected to the deflecting mans of the other said cathode-ray device, the train of impulses generated in the target electrode circuit of each said cathode-ray device being one signal component the two said trains of impulses forming the said intermittent signal.

11. A system for automatic computation employing remote indication and control according to the discovery claimed in claim 2 in which the apparatus for automatically representing a magnitude by an intermittent signal consisting of two distinct components comprises a plurality of phase displacing devices each of which has a rotor and a stator each rotor having a shaft coupled to individual gear in a train thereof, a shaft coupled to a gear in said train for mechanical coupling to a measuring device of the magnitude so that the angular displacement of each said rotor relative to its stator is related to that magnitude according to a mathematical function on an individual scale due to the gearing between said rotors, two sets of cathode-ray devices each set having as many cathode-ray devices as there are phase displacing devices in the said plurality thereof each said cathode-ray device having a system of electrodes for producing a beam of cathode rays, means for deflecting that beam, means for focusing the beam and a target electrode the said cathode-ray devices being connected to means for supplying appropriate operating electric potentials to the several electrodes of each device the cathode-ray devices of each said set thereof being in a series arrangement formed by coupling circuits whereby impulses generated in the target electrode circuit of a preceding device are applied to the control electrode of the next device, a multi-oscillator which supplies a polyphase oscillation of an individual frequency to the primary of each said phase displacing device the polyphase oscillation supplied to each said primary being also applied to the deflecting means of an individual cathode-ray device in one said set thereof and the polyphase oscillation induced in the secondary of each said phase displacing device being supplied to the deflecting means of an individual cathode-ray device in the said other set thereof so that in each said cathode-ray device there is a sweep of the beam of focused cathode rays relative to the target electrode therein at the frequency of the oscillation applied to its deflecting means and each said set of cathode-ray devices co-operate so that the last of the devices in the said series arrangement thereof generates a train of impulses the time interval between two successive impulses thereof being equal to the least common multiple of the periods of sweep in all of the devices of the set and the duration of impulse being that of the device with the highest frequency of sweep, the two trains of impulses produced by the said two sets of cathode-ray devices forming the intermittent signal which represents the said magnitude.

12. A system for automatic computation employing remote indication and control according to the discovery claimed in claim 1 in which the means for evaluating the magnitude represented by an intermittent signal of two distinct components comprises two rectifiers to which said signal is applied one of which suppresses one component and the other rectifier suppresses the other component thereby substantially separating the components of said signal, a multi-oscillator frequency and phase controlled by one said component which supplies an oscillation with an individual frequency to the deflecting means of each of a plurality of cathode-ray tubes the other component of said signal being applied to the control electrode of each said tube, means for supplying operative electric potentials to the several electrodes of each said tube a divided scale for the screen of each said tube the scale reading of the indication on the screen of each tube being a digit and all said scale readings are therefore a number which is the evaluation of the magnitude represented by said signal on a scale of notation in which the relative local values of two digits is decided by the frequency relation of the oscillations applied to the deflecting means of the corresponding tubes.

13. A system for automatic computation employing remote indication and control according to the discovery claimed in claim 1 in which apparatus for evaluation of a magnitude represented by an intermittent signal of two components comprises a plurality of phase displacing devices each having a stator and a rotor which has a shaft coupled to an individual gear in a train thereof, a servo motor having a shaft coupled to a gear in said train thereof, a system of rectifiers for substantially separating the two components of said signal, one said component being applied to a multi-oscillator for frequency and phase control of all oscillations produced thereby said multi-oscillator supplying an oscillation of an individual frequency to the primary of each said phase displacing device the oscillation induced in the secondary thereof being applied to the deflecting means of an individual cathode-ray device in a series arrangement of the plurality thereof coupled by circuits which apply impulses produced by a preceding such device to control the following such device, each said cathode-ray device having an electrode system for producing a focused beam of cathode rays and means for deflecting said beam to produce a sweep of said beam at the frequency of the oscillation applied to said deflecting means relative to a target electrode, means for supplying operative electric potentials to the several electrodes of each said cathode-ray device, an electronic comparing instrument to which is applied the other component of said signal and the train of impulses generated in the target electrode circuit of the last cathode-ray device in said series arrangement thereof said comparing instrument producing differential control impulses when there is a time displacement between said other component and the train of impulses and a series arrangement of a plurality of servo control devices a preceding servo control device in said series thereof servo controlling the following such device the first control device in the series being controlled by said differential control impulses and the last control device in the series controlling the aforesaid servo motor the angular displacement of the shaft of that motor being evaluation of the magnitude represented by said signal.

14. A system for automatic computation employing remote indication and control according to the discovery claimed in claim 4 in which apparatus for continuous automatic addition and subtraction of two magnitudes by producing an intermittent signal of two components which represents a magnitude which is the result of the operation comprises phase displacing means having a shaft for coupling to a measuring device of one said magnitude angular movement of the shaft effecting phase displacement in the means, an oscillator supplying oscillations to the primary circuits of said phase displacing means and to an impulse generator which includes a cathode-ray device having a target electrode in the circuit of which is generated a train of impulses frequency and timing controlled by said oscillations, a second such impulse generator to which are applied the oscillations induced in the secondary circuits of said phase displacing means thereby controlling the frequency and timing of a train of impulses generated by said second impulse generator, the two trains of impulses generated by the first said impulse generator and said second generator forming an intermittent signal of two distinct components which represents the said one magnitude, one of said trains of impulses as a common signal component is applied to a second oscillator for frequency and phase control of oscillations supplied by the second oscillator to the primary windings of a second means for phase displacing which is similar to the first said means and has a shaft for coupling to a measuring device of the second of said two magnitudes, the oscillation induced in the secondary windings of the second phase displacing means being applied to a third impulse generator similar to the first said impulse generator thereby controlling the frequency and phase thereof said third impulse generator producing a third train of impulses which together with the said common component forms an intermittent signal which represents the said second component, the said third component combined with the uncommon component of the signal representing the said one magnitude forming an intermittent signal which represents a magnitude which is the result of said operation in automatic computation.

15. A system of automatic computation employing remote indication and control according to the discovery claimed in claim 5 in which apparatus for multiplying and dividing the magnitude represented by an intermittent signal of two distinct components comprises a pair of rectifiers to each of which the initial signal representing the unchanged magnitude is applied one rectifier passing one signal component and the other rectifier passing the other signal component thereby substantially separating the components of the signal, a multi-oscillator for each separated component frequency and phase controlled thereby, each said oscillator supplying oscillations to an individual impulse generator which includes a cathode-ray device having an electrode system for producing a focused beam of cathode rays and deflecting means therefor to which is applied one frequency of oscillation thereby producing sweep of said focused beam relative to a target electrode at that frequency, each said impulse generator producing a train of impulses which is a new signal component the two new components being equally frequency changed relative to their respective said separated components the two new components forming an intermittent signal which represents a magnitude which is the result of the operation in automatic computation.

16. A system for automatic computation employing remote indication and control according to the discovery claimed in claim 7 in which apparatus for relating one magnitude to another magnitude according to a mathematical function comprises two movable members in a supporting frame the extent of movement of one said member being proportional to one said magnitude as a spatial magnitude and the extent of movement of the other said member being a spatial magnitude proportional to the other said magnitude, one said member having a surface in which is a groove which is a graph of the said mathematical function the graph having one co-ordinate parallel to the direction of movement of one said member and the other co-ordinate parallel to the direction of movement of the other said member, the other said member having a needle which engages in the said groove thereby interlinking the movements of said two members so that one spatial magnitude which is the extent of movement of one said member is related to another spatial magnitude as the extent of movement of the other said member by and according to said graph.

17. A system for automatic computation employing remote indication and control according to the discovery claimed in claim 8 in which apparatus for extracting a differential coefficient with respect to time of a varying magnitude comprises a phase displacing device having a shaft for coupling to a measuring device of said varying magnitude, an oscillator which supplies oscillations to said phase displacing device and to a first impulse generator for frequency and phase control thereof, the oscillations supplied to the phase displacing device being phase displaced therein to an extent proportional to angular adjustment of the said shaft thereof the phase displaced oscillations being supplied to a second impulse generator for frequency and phase control thereof, each said impulse generator including a cathode-ray device having an electrode system for producing a sweeping beam of focused cathode rays relative to a target electrode the frequency and phase of sweep controlled by the oscillations supplied to the corresponding impulse generator, each said impulse generator producing a train of impulses in the circuit of said target electrode of its cathode-ray device the two trains of impulses forming an intermittent signal which represents said varying magnitude, a second oscillator frequency and phase controlled by one said train of impulses the other said train of impulses being applied to a comparing instrument, said second oscillator supplying oscillations to a second phase displacing device similar to the first said phase displacing device the shaft of that second device being coupled to the shaft of a servo motor, a third impulse generator similar to said first impulse generator to which is supplied oscillations from the said second oscillator phase displaced by the said second phase displacing device the train of impulses generated by said third impulse generator is also applied to said comparing instrument which produces differential control impulses with any time displacement between the two trains of impulses applied to that instrument as aforesaid, said differential control impulses controlling a differential servo control device which is first and said servo motor last in a series arrangement of alternate differential servo control devices and servo motors in which each intermediate differential control device is directly actuated by the preceding servo motor and directly controls the following servo motor, the angular displacement of the shaft of the said last servo motor being related to said varying magnitude and the angular displacement of any other servo motor in said series arrangement is related to a differential coefficient with respect to time of that varying magnitude.

18. A system for automatic computation employing remote indication and control according to the discovery claimed in claim 1 which includes apparatus for combining in one intermittent signal by interspersal a plurality of intermittent signals each consisting of two distinct components of which one is common to all of said plurality of signals and apparatus for separating one of the signals from a signal of interspersed signals, said interspersing apparatus comprising an individual frequency changer for said common component and an individual frequency changer for each of the uncommon components of said plurality of signals, each said frequency changer consisting of a multi-oscillator frequency and phase controlled by its individual component which supplies oscillations through a phase adjuster to an impulse generator which generates a train of impulses the frequency of which is equal to that of the controlling component divided by a common factor, that factor being the same for all of said frequency changers and greater than the number of signals in said plurality thereof so that with fixed settings of said phase adjusters the time displacement of each uncommon component after frequency change is limited to an individual range of time displacement relative to the common component after frequency change thereof, all of the generated trains of impulses combined forming the said interspersed signal, and the said separating apparatus comprises a rectifier for substantially separating the common component from an interspersed signal, an oscillator frequency and phase controlled by said common component which supplies an oscillation at the frequency of said common component through a phase adjuster to the deflecting means of a cathode-ray device which has a system of electrodes for producing a focused beam of cathode rays, a control electrode and a target electrode, means for supplying operative electric potentials to the several electrodes of said cathode-ray device said deflecting means producing a sweep of the focused beam of cathode rays at the frequency of said common component relative to said target electrode, the said interspersed signal being applied to said control electrode so that by a fixed setting of said phase adjuster a train of impulses is produced in the circuit of said target electrode in response to one only of the plurality of uncommon components in said interspersed signal according to the said setting so that said phase adjuster is the means for selecting which of said uncommon components is effective in producing the train of impulses in said target electrode circuit and that train of impulses combined with the common component of the interspersed signal forms one signal extracted from the plurality of signals in the said interspersed signal.

19. A system for automatic computation employing remote indication and control which includes a first and a second instrument each of which provides an intermittent signal which represents an individual magnitude and a third instrument which evaluates the magnitude represented by an intermittent signal formed by combination of the signals provided by said first and second instruments, each of said first and second instruments comprising a polyphase phase displacing device having an armature 12 (Fig. 1) and a stator 13 to which is applied its said individual magnitude as an angular displacement of the armature relative to the stator by means of a shaft 2a of that armature, an oscillator 40 (Fig. 2) which supplies an electrical oscillation to a phase splitter 43 in which polyphase oscillations are derived from that oscillation and supplied through leads 44 to the deflecting electrodes of a first cathode-ray device 48 and to the terminals 26 which are connected to the terminals 24 of the windings of the said stator, a second cathode-ray device 46 to the deflecting electrodes of which are applied the polyphase oscillations induced in said armature the connections therefor being by means of sliprings 21 and brushes 22 connected to terminals 23 which are connected to the deflecting electrodes, said first and second cathode-ray devices each having a target electrode 52 (Figs. 3 and 5) in the circuit of which is an output impedance 86 with terminals 30 with the first device and 83 with terminals 31 with the second device, and means for supplying operative potentials to the several electrodes of said cathode-ray devices which include, such as a transformer having primary terminals 66, primary 67, secondaries 68, 69, 74, 77, 79, 81 and 84 and rectifiers 70, 73, 82 and 85, the said first cathode-ray device generates a train of impulses because the polyphase oscillations applied to its deflecting electrodes causes sweep of its beam of cathode rays relative to its target electrode and similarly the said second cathode-ray device generates another train of impulses time displaced relative to the train of the first device to an extent depending on the angular displacement of the said armature relative to the said stator and therefore said two trains of impulses together form an intermittent signal in which each of a sequence of instantaneous values of said individual magnitude is related to an individual ration of time intervals which is that of the time interval between one of a pair of successive impulses of one said train and an intermediate impulse of the other said train to the time interval between said pair of impulses, the intermittent signals of said first and second instruments being combined by making the impulses of one component train of impulses of each of said signals simultaneous and adding the remaining component trains of impulses of those signals, for example by connecting terminals 31 of the first instrument to terminals 30 of the second instrument thereby controlling the frequency and phase of the oscillation produced by the oscillator 40 (Fig. 2) of the second instrument and therewith the timing of the impulses produced across terminals 30 of the second instrument and connecting the terminals 30 of the first instrument in series with the terminals 31 of the second instrument in a transmission circuit which contains the said third evaluating instrument, thereby forming a combined signal which represents a resultant magnitude of said individual magnitudes in the same manner as each individual magnitude is represented by its intermittent signal, said third evaluating instrument comprising terminals 33 (Fig. 5) connected to the input circuits of parallel differential rectifiers 88 and 89 the output circuits of which are connected through a reversing switch 39 to pairs of terminals 34 and 35, an oscillator 40 (Fig. 2), phase splitter 43, a cathode-ray tube 37 with its control electrode connected through a switch 38 to terminals 35, and means for supplying operative potentials to said oscillator and to the several electrodes of said rectifiers and cathode-ray tube the therminals 33 being connected in a transmission circuit with said first and second instruments and thereby said combined signal is applied to rectifiers 88 and 89 by which it is substantially separated into its component trains of impulses one of which is supplied through terminals 35 to control the cathode-ray tube and the other train of impulses is supplied through terminals 34 to control the frequency and phase of an oscillation produced by the oscillator 40 and supplied to the phase splitter 43 in which polyphase oscillations are derived from said oscillation and supplied to the deflecting electrodes of the said cathode-ray tube through leads 44 to terminals 26 and connections therefrom to terminals 23 which are connected to the deflecting electrodes, said polyphase oscillations causing sweep of the beam of cathode rays in tube 37 and that beam is controlled by impulses from terminals 35 thereby providing an indication on the fluorescent screen of that tube spatially separated from a zero position of indication to an extent which is proportional to said resultant magnitude.

20. A system according to claim 19 which includes an instrument having terminals 33 (Fig. 5) to which said combined intermittent signal is applied and comprising parallel differential rectifiers 88 and 89 connected to terminals 33 which substantially separate the component trains of impulses of that combined signal supplying one component train to terminals 35 and the other component train to the terminals 34, an oscillator 40 frequency and phase controlled by the train of impulses across terminals 34 which produces an oscillation which is supplied to a phase splitter 41 and a harmonic oscillation which is supplied to phase splitter 43, a phase displacing device with stator 11 to which polyphase oscillations derived from said oscillation are supplied by phase splitter 41, a phase displacing device with stator 13 to which polyphase oscillations derived from said harmonic oscillation are supplied by phase splitter 43, an armature 10 (Fig. 1) on a shaft 2 angularly adjustable in bearings relative to stator 11, an armature 12 on a shaft 2a angularly adjustable in bearings relative to stator 13, gearing 4—6 having a ratio equal to that of said oscillation to said harmonic oscillation frequencies between shafts 2 and 2a, a cathode-ray device 45 (Fig. 2) to the deflecting electrodes of which are applied polyphase oscillations induced in armature 10, a cathode-ray device 46 to the deflecting electrodes of which are applied polyphase oscillations induced in armature 12, the device 45 has a target electrode 52 (Fig. 3) the circuit of which is coupled by an impedance 75 (Fig. 5) to the control electrode circuit of the device 46 which also has a target electrode 52 in the circuit of which is an output impedance 83 with terminals 31 and means for supplying operative electric potentials to the several electrodes of cathode-ray devices 45 and 46 and of rectifiers 88 and 89, such as primary terminals 66 for connection to mains supply of a transformer primary 67 which has secondaries 74, 77, 79, 81, 69, 68, 84, 93 and 90 with rectifiers 70, 73, 82, 85, 91 and 94, the cathode-ray device 46 producing across terminals 31 a train of impulses which are time displaced relative to the train of impulses across terminals 34 to an extent dependent on the angular adjustment of shaft 2, a differential trigger relay Fig. 6 with its input circuits connected to terminals 31 and 35 (Fig. 5) and having output valves 101 and 104 in the output circuits of which is connected a differential solenoid 102—104 (Figs. 6 and 8), a transformer with terminals 98 for connection to mains supply supplying rectifiers 99 and 100 (Fig. 6) for supplying operative potentials to said differential trigger relay, that relay supplying zero differential current to the differential solenoid 102—105 when impulses across terminals 31 and 35 are simultaneous, impulses of one polarity when impulses across terminals 31 are in advance of those across terminals 35 and impulses of opposite polarity when impulses across terminals 35 are in advance of those across terminals 31 and the duration of impulses supplied to solenoids 102—105 are substantially proportional to the amount of such advance, a servo system comprising a source of hydraulic power 124 (Fig. 8), differential control valves 127—128 and 139 supplied by that source, valve 127—128 being actuated by said differential solenoid 102—105 by means of plungers 130 and 131, rod 132, pin 135 and arm 129 thereby valve 127—128 controls differential servo actuation of the valve 139 by controlling supply of fluid to cylinders 142 and 143 and thereby movements of a plunger 140 in said cylinders, a pin 141 in the plunger 140 causing movement of the arm 129 of the valve 139, and a hydraulic servo motor 146 supplied with differentially controlled fluid by the valve 139 said motor having a shaft 147 which is coupled to said shaft 2 (Fig. 1) for automatic angular adjustment thereof until the angular displacement of shaft 2 from a zero position corresponds to the resultant magnitude represented by the aforesaid combined signal.

GEORGE WILLIAM WALTON.

REFERENCES CITED

The following references are of record in the file of this patent:

UNITED STATES PATENTS

| Number | Name | Date |
|---|---|---|
| 1,965,046 | Methlin | July 3, 1934 |
| 2,110,746 | Tolson | Mar. 8, 1938 |
| 2,256,487 | Moseley et al. | Sept. 23, 1941 |

FOREIGN PATENTS

| Number | Country | Date |
|---|---|---|
| 560,928 | Great Britain | Apr. 27, 1944 |